(12) United States Patent
Sawai et al.

(10) Patent No.: US 8,157,237 B2
(45) Date of Patent: Apr. 17, 2012

(54) DISPLAY SCREEN TURNING APPARATUS

(75) Inventors: Kunio Sawai, Daito (JP); Toshiharu Hibi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 706 days.

(21) Appl. No.: 11/935,733

(22) Filed: Nov. 6, 2007

(65) Prior Publication Data
US 2008/0105073 A1 May 8, 2008

(30) Foreign Application Priority Data

Nov. 7, 2006 (JP) ................................. 2006-301085

(51) Int. Cl.
*A47B 91/00* (2006.01)
*A47F 5/02* (2006.01)

(52) U.S. Cl. ..................... 248/349.1; 248/131; 248/917; 361/679.06; 361/679.21

(58) Field of Classification Search ................... 248/131, 248/349.1, 291.1, 292.12, 289.1, 276.1, 917–921; 361/679.01, 679.02, 679.21, 679.22, 679.06, 361/679.07, 681–683
See application file for complete search history.

(56) References Cited

U.S. PATENT DOCUMENTS

| 5,362,144 A * | 11/1994 | Shioya et al. ............... 312/319.6 |
| 5,715,138 A | 2/1998 | Choi |
| 5,847,685 A * | 12/1998 | Otsuki ............................ 345/87 |
| 6,007,038 A * | 12/1999 | Han ................................ 248/371 |
| 7,631,843 B2 * | 12/2009 | Makino ....................... 248/176.1 |
| 7,762,513 B2 * | 7/2010 | Sawai et al. ................. 248/349.1 |
| 7,817,410 B2 * | 10/2010 | Sawai ....................... 361/679.22 |
| 7,950,610 B2 * | 5/2011 | Sawai ............................ 248/131 |
| 2002/0001049 A1 * | 1/2002 | Endo et al. ....................... 349/58 |
| 2006/0215073 A1 * | 9/2006 | Liao ................................. 349/58 |
| 2007/0025853 A1 * | 2/2007 | Chen et al. ..................... 416/100 |
| 2007/0040949 A1 * | 2/2007 | Lin et al. ........................ 248/917 |
| 2007/0194184 A1 * | 8/2007 | Jang .............................. 248/131 |
| 2008/0049390 A1 * | 2/2008 | Sawai et al. ................... 361/681 |
| 2008/0093515 A1 * | 4/2008 | Makino ....................... 248/176.1 |
| 2008/0149800 A1 * | 6/2008 | Katsumata et al. ........ 248/349.1 |
| 2008/0192419 A1 * | 8/2008 | Sawai ............................ 361/681 |

FOREIGN PATENT DOCUMENTS

| GB | 2 332 843 A | 6/1999 |
| JP | 63-569 U | 1/1988 |
| JP | 6-225245 A | 8/1994 |
| JP | 2004-258055 A | 9/2004 |
| JP | 2004-304679 A | 10/2004 |

OTHER PUBLICATIONS

The Extended European Search Report dated Sep. 6, 2010 (Nine (9) pages).

\* cited by examiner

*Primary Examiner* — Tan Le
(74) *Attorney, Agent, or Firm* — Crowell & Moring LLP

(57) ABSTRACT

A display screen turning apparatus includes a base portion for placing a display screen portion thereon, a driving source and a transmission gear portion arranged inside the base portion, a display screen support member provided with an engaging member and supporting the display screen portion rotatably in a horizontal plane and rotatably with respect to a vertical plane and a rack plate arranged on the base portion and including a rack gear meshed with the transmission gear portion in a horizontal direction. The display screen support member is rotated in an anteroposterior direction with respect to the vertical plane by a prescribed angle with rotation of the engaging member of the display screen support member engaged with the rack plate following reciprocation of the rack plate in the horizontal plane with normal and reverse rotation of the driving source.

10 Claims, 27 Drawing Sheets

DISPLAY SCREEN TURNING APPARATUS

BACKGROUND OF THE INVENTION

1. Field of the Invention

The present invention relates to a display screen turning apparatus, and more particularly, it relates to a display screen turning apparatus comprising a base portion for placing a display screen portion.

2. Description of the Background Art

A display screen turning apparatus comprising a base portion for placing a display screen portion or the like is known in general, as disclosed in Japanese Patent Laying-Open Nos. 6-225245 (1994), 2004-258055 and 2004-304679, for example.

The aforementioned Japanese Patent Laying-Open No. 6-225245 discloses a projection television (display) comprising a tilt mechanism (display screen turning apparatus) including a tilt drive motor fixed on an upper surface of a tilting base (base portion), a tilt gear train (transmission gear portion) and an arcuate rack gear fixed with a gear portion with the bottom down on the bottom of the projection television body (display screen portion), a plurality of tilting rollers rotatably provided on the bottom of the projection television body and a tilting guide provided on the upper surface of the tilting base (base portion). In this projection television (display), the projection television body (display screen portion) is placed on the tilting base (base portion) in a state where the plurality of tilting rollers are rotatably fitted into grooves of the tilting guide, and the driving force of the tilt drive motor is transmitted to the rack gear through the tilt gear train (transmission gear portion) located below the rack gear so that the projection television body (display screen portion) can turn on the tilting base (base portion) in a vertical direction.

The aforementioned Japanese Patent Laying-Open Nos. 2004-258055 and 2004-304679 each disclose an electric rotary mechanism for a display comprising a tilt mechanism including a horizontally long support frame having a groove and rotatably supporting a support plate provided on a lower back surface of a display along with the display in a vertical direction, an electric motor and a reducing gear (transmission gear portion) mounted on the support frame in an upright direction, a rotating arm with a first end fixed on a drive shaft closer to the reducing gear (transmission gear portion) and a coupling arm with a first end rotatably coupling to the support plate. In this electric rotary mechanism for a display described in Japanese Patent Laying-Open Nos. 2004-258055 and 2004-304679, second ends of the rotating and coupling arms are rotatably coupled to each other with a shaft member and the driving force of the electric motor is transmitted to the rotating arm, the coupling arm and the support plate in this order through the reducing gear (transmission gear portion) so that the display (display screen portion) can turn on the support frame along with the support plate in a vertical direction.

In the projection television (display) comprising the conventional tilt mechanism (display screen turning apparatus) proposed in the aforementioned Japanese Patent Laying-Open No. 6-225245, however, the own weight of the projection television body (display screen portion) is conceivably applied to the tilting base (base portion) through the tilting rollers and the tilting guide, while the rack gear meshes so as to cover the tilt gear train (transmission gear portion) from above and hence the load from the projection television body (display screen portion) is conceivably applied also to the tilt gear train (transmission gear portion). Therefore, it is disadvantageously difficult that the tilt gear train (transmission gear portion) smoothly transmits the driving force of the tilt gear train (transmission gear portion), due to the load applied from the projection television body (display screen portion).

In the conventional electric rotary mechanism for a display proposed in each of the aforementioned Japanese Patent Laying-Open Nos. 2004-258055 and 2004-304679, the reducing gear (transmission gear portion) is conceivably designed such that a plurality of gears having a large gear ratio are combined with respect to the electric motor driving at a high speed to reduce its speed by a low rotational speed in order to turn the display (display screen portion). Therefore, in view of sizes of the members of the reducing gear (transmission gear portion) including the electric motor, it is disadvantageously difficult in design that the reducing gear (transmission gear portion) and the electric motor are provided on the horizontally long support frame in an upright manner.

SUMMARY OF THE INVENTION

The present invention has been proposed in order to solve the aforementioned problems, and an object of the present invention is to provide a display screen turning apparatus capable of smoothly transmitting driving force with a transmission gear portion and easily arranging the transmission gear portion large in size.

A display screen turning apparatus according to a first aspect of the present invention comprises a base portion for placing a display screen portion thereon, a driving source arranged inside the base portion, a transmission gear portion for transmitting driving force of the driving source, arranged inside the base portion, a display screen support member provided with an engaging member and supporting the display screen portion rotatably in a horizontal plane and rotatably with respect to a vertical plane, and a rack plate arranged on the base portion and including a rack gear meshed with the transmission gear portion in a horizontal direction, wherein the display screen support member is rotated in an anteroposterior direction with respect to the vertical plane by a prescribed angle with rotation of the engaging member of the display screen support member engaged with the rack plate following reciprocation of the rack plate in the horizontal plane with normal and reverse rotation of the driving source.

In the display screen turning apparatus according to the first aspect of the present invention, as hereinabove described, the display screen turning apparatus comprises the driving source arranged inside the base portion and the transmission gear portion for transmitting the driving force of the driving source, arranged inside the base portion, whereby both the transmission gear portion difficult to be downsized and the driving source of the transmission gear portion can be housed inside the base portion and hence the transmission gear portion large in size can be easily arranged. The display screen turning apparatus comprises the display screen support member provided with the engaging member and supporting the display screen portion rotatably in the horizontal plane and rotatably with respect to the vertical plane, and the rack plate arranged on the base portion and including the rack gear meshed with the transmission gear portion in the horizontal direction, and the engaging member of the display screen support member engaged with the rack plate rotates following reciprocation of the rack plate in the horizontal plane by the normal and reverse rotation of the driving source so that the display screen support member rotates in the anteroposterior direction by the prescribed angle with respect to the vertical plane, whereby the own weight of the display screen portion is applied to the display screen support member regardless of the time of the stop of the display screen portion and the time of the turning operation of the display screen portion, while not applied to the transmission gear portion meshed through the rack plate and the rack gear in the horizontal direction, and hence the driving force can be smoothly transmitted with the transmission gear portion.

The aforementioned display screen turning apparatus according to the first aspect preferably further comprises a pair of support shafts provided on the base portion and reciprocably supporting the rack plate in the horizontal plane, wherein the rack plate is preferably movably supported with respect to the pair of support shafts so that the rack plate can reciprocate on a line connecting the pair of support shafts. According to this structure, the rack plate is linearly reciprocated through the rack gear in the state of being supported by the pair of support shafts and hence the display screen support member engaged with the rack plate can be stably rotated.

In the aforementioned display screen turning apparatus according to the first aspect, the rack plate preferably includes a pair of slot-shaped support holes extending substantially parallel to a direction in which the rack plate reciprocates in the horizontal plane, and the pair of support holes preferably receive the pair of support shafts on the base portion so that the rack plate is movably supported with respect to the pair of support shafts. According to this structure, the rack plate can be reciprocated limiting in the range of the longitudinal length of the support holes receiving the pair of support shafts on the base portion and hence the display screen support member can be easily rotated in the anteroposterior direction by the prescribed angle.

In the aforementioned display screen turning apparatus according to the first aspect, the transmission gear portion preferably includes a torque limiter interrupting the driving force of the driving source when the driving force of the driving source exceeds a prescribed value. According to this structure, the driving force of the driving source continuously rotating can be interrupted with the torque limiter when the vertical turn of the display screen portion is stopped by abrupt external force or the like, or when the turning angle of the display screen portion reaches maximum value to stop the turning operation, and hence the driving force of the driving source is not transmitted to the transmission gear portion. Therefore, the transmission gear portion can be inhibited from being broken due to excessive rotation when the driving force of the driving source exceeds a prescribed torque.

In the aforementioned display screen turning apparatus according to the first aspect, the driving source preferably transmits the driving force of the driving source to the transmission gear portion through a worm gear provided on a driving axis of the driving source. According to this structure, the worm gear can not be rotated with rotation of the gears also when the respective gears constituting the transmission gear portion are sequentially driven following the turn of the display screen portion due to abrupt external force and hence the driving source can be inhibited from reversely driving with driving force other than the driving force of the driving source.

In the aforementioned display screen turning apparatus according to the first aspect, the engaging member is preferably provided on a vertical segment passing a rotation center in the horizontal plane of the display screen support member. According to this structure, the engaging member is located on the rotation center in the horizontal plane of the display screen support member also when the display screen portion rotates (turns) in the horizontal plane and hence the rack plate does not move in the direction intersecting with the moving direction in the horizontal plane and the engaging member and the rack plate are continuously engaged with each other. Therefore, the display screen support member and the display screen portion can be rotated (turned) in the anteroposterior direction with respect to the vertical plane, also when the rack plate is reciprocated from a state where the display screen portion is rotated (turned) in the horizontal plane.

In the aforementioned display screen turning apparatus according to the first aspect, the rack plate preferably further includes a first engaging portion rotatably engaged with the engaging member of the display screen support member. According to this structure, reciprocation of the rack plate can be easily transmitted to the display screen support member through the first engaging portion.

In this case, the first engaging portion of the rack plate preferably includes a slot-shaped engaging hole extending in a direction intersecting with a direction in which the rack plate reciprocates in the horizontal plane. According to this structure, the engaging member of the display screen support member can be continuously engaged with the first engaging portion of the rack plate while moving inside the engaging hole of rack plate also when the display screen portion is rotated (turned) in the anteroposterior direction with respect to the vertical plane in the state of being rotated (turned) in the horizontal plane, and hence the display screen support member can be easily rotated (turned) in the anteroposterior direction with respect to the vertical plane.

The aforementioned display screen turning apparatus according to the first aspect preferably further comprises a locking lever rotatably provided on the rack plate and integrally including a second engaging portion engaged with the engaging member of the display screen support member, wherein the display screen support member is so formed as to be rotatable to the vicinity of a horizontal position when engagement between the second engaging portion and the engaging member of the display screen support member is released. According to this structure, the display screen portion can be easily rotated to the vicinity of the horizontal position also when the display is housed in a prescribed place or is moved to other place.

In this case, the locking lever preferably further includes a guide portion for automatically recovering the engaging state between the engaging member and the second engaging portion of the locking lever along with rotation of the engaging member provided in the display screen support member when the display screen support member rotates from the vicinity of the horizontal position in a vertical direction. According to this structure, the engaging member provided in the display screen support member is rotated along the guide portion of the locking lever and guided to the second engaging portion when the display screen portion is rotated from the horizontal position (at the time of housing or the like) in the vertical direction (at the time of watching and listening) and hence the engaging state between the engaging member and the second engaging portion of the locking lever can be easily recovered. Therefore, the engaging state between the engaging member and the second engaging portion of the locking lever can be automatically recovered without any special operation for recovering the engaging state by the user.

In this case, the rack plate preferably includes a hole formed in a shape larger than a rotating region of the engaging member at the time of the engagement between the engaging member of the display screen support member and the second engaging portion of the locking lever and at the time of the release of the engagement between the engaging member of the display screen support member and the second engaging portion of the locking lever. According to this structure, the engaging member moves in a prescribed region inside the hole of the rack plate when the display screen support member rotates, and hence the display screen support member can be rotated without interference between the engaging member and the rack plate.

In the aforementioned structure in which the rack plate includes the guide portion, the locking lever is preferably so formed as to transmit reciprocation of the rack plate in the horizontal plane to the display screen support member when the second engaging portion and the engaging member of the display screen support member engage with each other. According to this structure, the locking lever not only releases the engagement between the rack plate and the display screen support member, but also transmits the reciprocation of the rack plate to the display screen support member, and hence the locking lever can be further functionally used.

In this case, the display screen turning apparatus preferably further comprises an urging member urging the locking lever in a direction in which the second engaging portion of the locking lever is engaged with the engaging member of the display screen support member again when the engagement between the second engaging portion of the locking lever and the engaging member of the display screen support member is released. According to this structure, the locking lever is always urged (rotated) with the urging member in the direction where the second engaging portion is engaged with the engaging member of the display screen support member and hence the user can easily operate dissimilarly to a case where the user manually recovers the engagement between the locking lever and the display screen support member.

A display screen turning apparatus according to a second aspect of the present invention comprises a base portion for placing a display screen portion thereon, a driving source arranged inside the base portion, a transmission gear portion for transmitting driving force of the driving source through a worm gear provided on a driving axis of the driving source, arranged inside the base portion, and including a torque limiter interrupting the driving force of the driving source when the driving force of the driving source exceeds a prescribed value, a display screen support member supporting the display screen portion rotatably in a horizontal plane and rotatably with respect to a vertical plane and provided with an engaging member on a vertical segment passing a rotation center in the horizontal plane, and a rack plate arranged on the base portion and including a first engaging portion rotatably engaged with the engaging member of the display screen support member and a rack gear meshed with the transmission gear portion in a horizontal direction, wherein the display screen support member is rotated in an anteroposterior direction with respect to the vertical plane by a prescribed angle with rotation of the engaging member of the display screen support member engaged with the first engaging portion of the rack plate following reciprocation of the rack plate in the horizontal plane with normal and reverse rotation of the driving source, and the first engaging portion of the rack plate includes a slot-shaped engaging hole extending in a direction intersecting with a direction in which the rack plate reciprocates in the horizontal plane.

In the display screen turning apparatus according to the second aspect of the present invention, as hereinabove described, the display screen turning apparatus comprises the driving source arranged inside the base portion and the transmission gear portion for transmitting the driving force of the driving source, arranged inside the base portion, whereby both the transmission gear portion difficult to be downsized and the driving source of the transmission gear portion can be housed inside the base portion and hence the transmission gear portion large in size can be easily arranged. The display screen turning apparatus comprises the display screen support member provided with the engaging member and supporting the display screen portion rotatably in the horizontal plane and rotatably with respect to the vertical plane, and the rack plate arranged on the base portion and including the first engaging portion engaged with the engaging member of the display screen support member and the rack gear meshed with the transmission gear portion in the horizontal direction, and the engaging member of the display screen support member engaged with the first engaging portion of the rack plate rotates following reciprocation of the rack plate in the horizontal plane by the normal and reverse rotation of the driving source so that the display screen support member rotates in the anteroposterior direction by the prescribed angle with respect to the vertical plane, whereby the own weight of the display screen portion is applied to the display screen support member regardless of the time of the stop of the display screen portion and the time of the turning operation of the display screen portion, while not applied to the transmission gear portion meshed through the rack plate and the rack gear in the horizontal direction, and hence the driving force can be smoothly transmitted with the transmission gear portion.

In the display screen turning apparatus according to the second aspect, the transmission gear portion includes the torque limiter interrupting the driving force of the driving source when the driving force of the driving source exceeds the prescribed value, whereby the driving force of the driving source continuously rotating can be interrupted with the torque limiter when the vertical turn of the display screen portion is stopped by abrupt external force or the like, or when the turning angle of the display screen portion reaches maximum value to stop the turning operation, and hence the driving force of the driving source is not transmitted to the transmission gear portion. Therefore, the transmission gear portion can be inhibited from being broken due to excessive rotation when the driving force of the driving source exceeds a prescribed torque. The driving source transmits the driving force of the driving source to the transmission gear portion through the worm gear provided on the driving axis of the driving source, whereby the worm gear can not be rotated with rotation of the gears also when the respective gears constituting the transmission gear portion are sequentially driven following the turn of the display screen portion due to abrupt external force and hence the driving source can be inhibited from reversely driving with driving force other than the driving force of the driving source.

In the display screen turning apparatus according to the second aspect, the engaging member is provided on the vertical segment passing the rotation center in the horizontal plane of the display screen support member, whereby the engaging member is located on the rotation center in the horizontal plane of the display screen support member also when the display screen portion rotates (turns) in the horizontal plane and hence the rack plate does not move in the direction intersecting with the moving direction in the horizontal plane and the engaging member and the first engaging portion of the rack plate are continuously engaged with each other. Therefore, the display screen support member and the display screen portion can be rotated (turned) in the anteroposterior direction with respect to the vertical plane, also when the rack plate is reciprocated from a state where the display screen portion is rotated (turned) in the horizontal plane. The first engaging portion of the rack plate includes the slot-shaped engaging hole extending in the direction intersecting with the direction in which the rack plate reciprocates in the horizontal plane, whereby the engaging member of the display screen support member can be continuously engaged with the first engaging portion of the rack plate while moving inside the engaging hole of rack plate also when the display screen portion is rotated (turned) in the anteroposterior direction with respect to the vertical plane in the state of being rotated (turned) in the horizontal plane, and hence the display screen support member can be easily rotated (turned) in the anteroposterior direction with respect to the vertical plane.

The aforementioned display screen turning apparatus according to the second aspect preferably further comprises a pair of support shafts provided on the base portion and reciprocably supporting the rack plate in the horizontal plane, wherein the rack plate is movably supported with respect to the pair of support shafts so that the rack plate can reciprocate on a line connecting the pair of support shafts. According to this structure, the rack plate is linearly reciprocated through the rack gear in the state of being supported by the pair of support shafts and hence the display screen support member engaged with the rack plate can be stably rotated.

In this case, the rack plate preferably further includes a pair of slot-shaped support holes extending substantially parallel to a direction in which the rack plate reciprocates in the horizontal plane, and the pair of support holes preferably receive the pair of support shafts on the base portion so that the rack plate is movably supported with respect to the pair of support shafts. According to this structure, the rack plate can be reciprocated limiting in the range of the longitudinal length of the support holes receiving the pair of support shafts on the base portion and hence the display screen support member can be easily rotated in the anteroposterior direction by the prescribed angle.

A display screen turning apparatus according to a third aspect of the present invention comprises a base portion for placing a display screen portion thereon, a driving source arranged inside the base portion, a transmission gear portion for transmitting driving force of the driving source, arranged inside the base portion, a display screen support member provided with an engaging member and supporting the display screen portion rotatably in a horizontal plane and rotatably with respect to a vertical plane, a rack plate arranged on the base portion and including a rack gear meshed with the transmission gear portion in a horizontal direction, and a locking lever rotatably provided on the rack plate and integrally including an engaging portion engaged with the engaging member of the display screen support member, wherein the display screen support member is rotated in an anteroposterior direction with respect to the vertical plane by a prescribed angle with rotation of the engaging member of the display screen support member rotatably engaged with the engaging portion of the locking lever following reciprocation of the rack plate in the horizontal plane with normal and reverse rotation of the driving source, and is rotatable to the vicinity of a horizontal position when engagement between the engaging portion and the engaging member of the display screen support member is released.

In the display screen turning apparatus according to the third aspect of the present invention, as hereinabove described, the display screen turning apparatus comprises the driving source arranged inside the base portion and the transmission gear portion for transmitting the driving force of the driving source, arranged inside the base portion, whereby both the transmission gear portion difficult to be downsized and the driving source of the transmission gear portion can be housed inside the base portion and hence the transmission gear portion large in size can be easily arranged. The display screen turning apparatus comprises the display screen support member provided with the engaging member and supporting the display screen portion rotatably in the horizontal plane and rotatably with respect to the vertical plane, the rack plate arranged on the base portion and including the rack gear meshed with the transmission gear portion in the horizontal direction, and the locking lever rotatably provided on the rack plate and integrally including the engaging portion engaged with the engaging member of the display screen support member, and the engaging member of the display screen support member rotatably engaged with the engaging portion of the locking lever following reciprocation of the rack plate in the horizontal plane by the normal and reverse rotation of the driving source so that the display screen support member rotates in the anteroposterior direction by the prescribed angle with respect to the vertical plane, whereby the own weight of the display screen portion is applied to the display screen support member regardless of the time of the stop of the display screen portion and the time of the turning operation of the display screen portion, while not applied to the transmission gear portion meshed through the locking lever, the rack plate and the rack gear in the horizontal direction, and hence the driving force can be smoothly transmitted with the transmission gear portion. The display screen support member is so formed as to be rotatable to the vicinity of the horizontal position when engagement between the engaging portion of the locking lever and the engaging member of the display screen support member is released, whereby the display screen portion can be easily rotated to the vicinity of the horizontal position also when the display is housed in a prescribed place or is moved to other place.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

First Embodiment

Structures of a display screen turning apparatus 20 and a liquid crystal television 100 provided with the display screen turning apparatus 20 according to the first embodiment of the present invention will be now described with reference to FIGS. 1 to 14. The first embodiment of the present invention is applied to the display screen turning apparatus of the liquid crystal television, which is an exemplary display.

Figure 1:
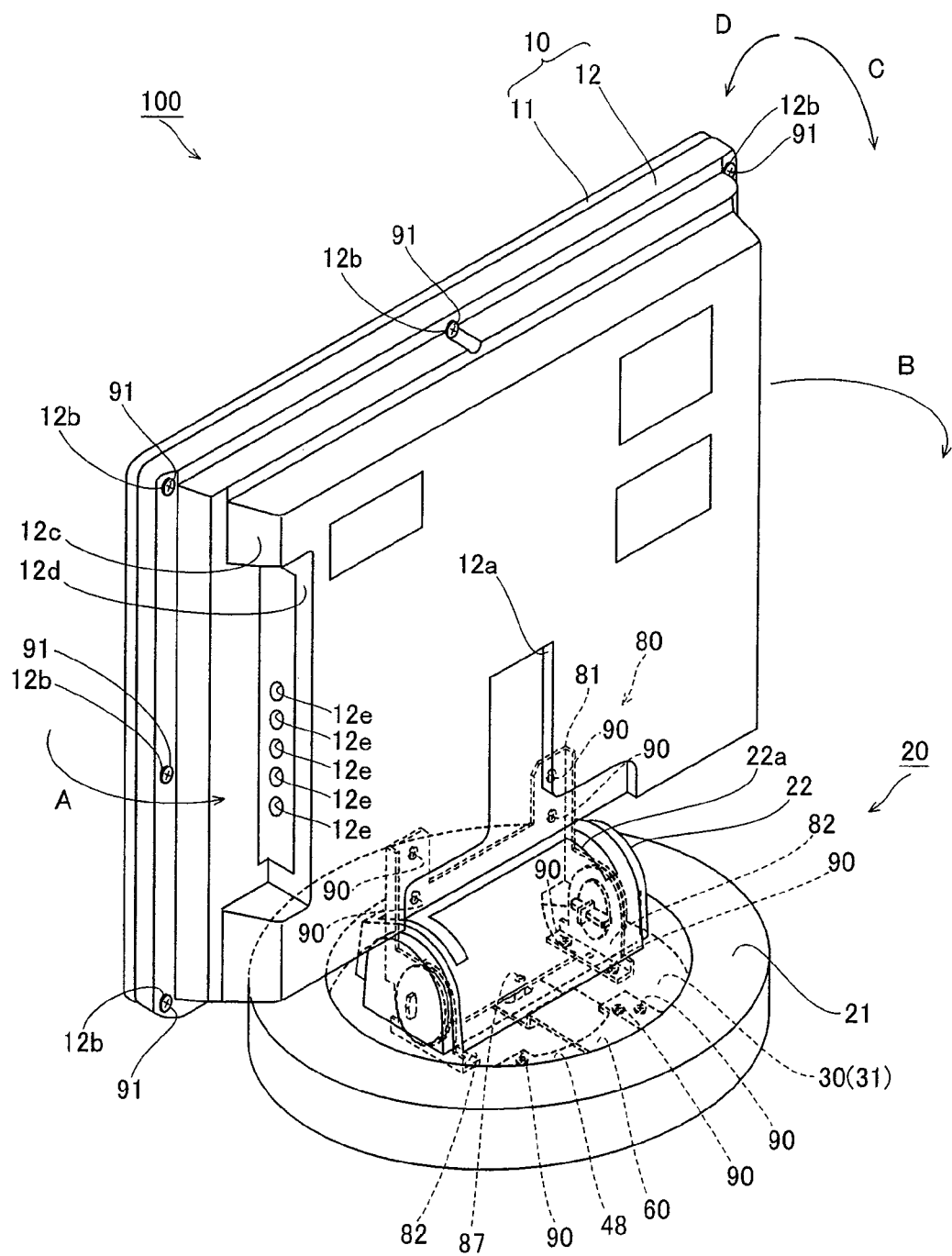
FIG. 1 is a perspective view showing an overall structure of a liquid crystal television provided with a display screen turning apparatus according to a first embodiment of the present invention.

As shown in FIG. 1, the display screen turning apparatus 20 according to the first embodiment of the present invention is so provided as to be turnable a display body 10 of the liquid crystal television 100 supported with a display screen support mechanism 80 in a horizontal direction (along arrows A and B) in a horizontal plane by a prescribed angle (±30° in the first embodiment) and incline the display body 10 in an anteroposterior direction (along arrows C and D) with respect to a vertical plane by a prescribed angle (±10° in the first embodiment). The display body 10 is an example of the "display screen portion" in the present invention.

Figure 2:
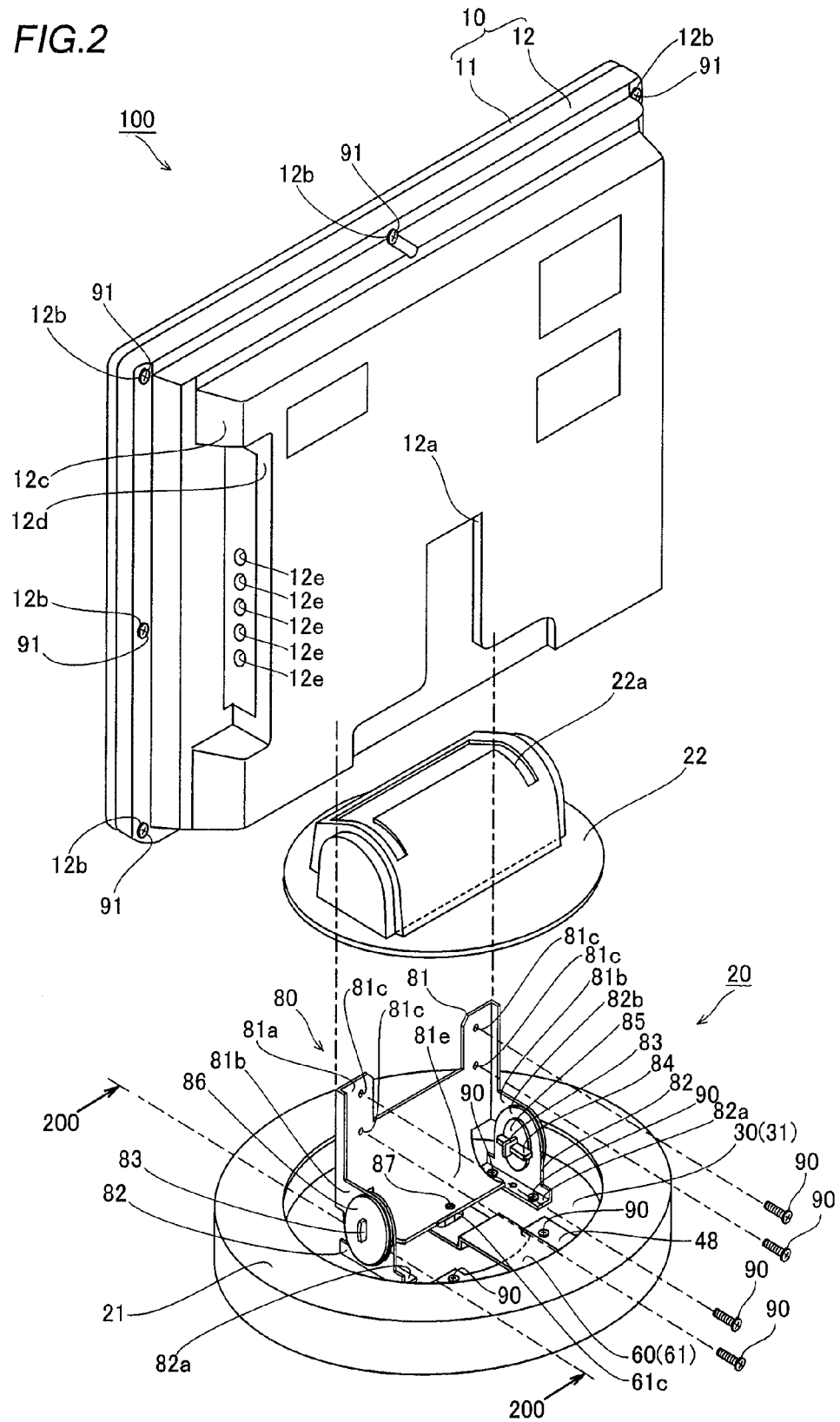
FIG. 2 is an exploded perspective view of the liquid crystal television provided with the display screen turning apparatus according to the first embodiment of the present invention shown in FIG. 1.
Figure 3:
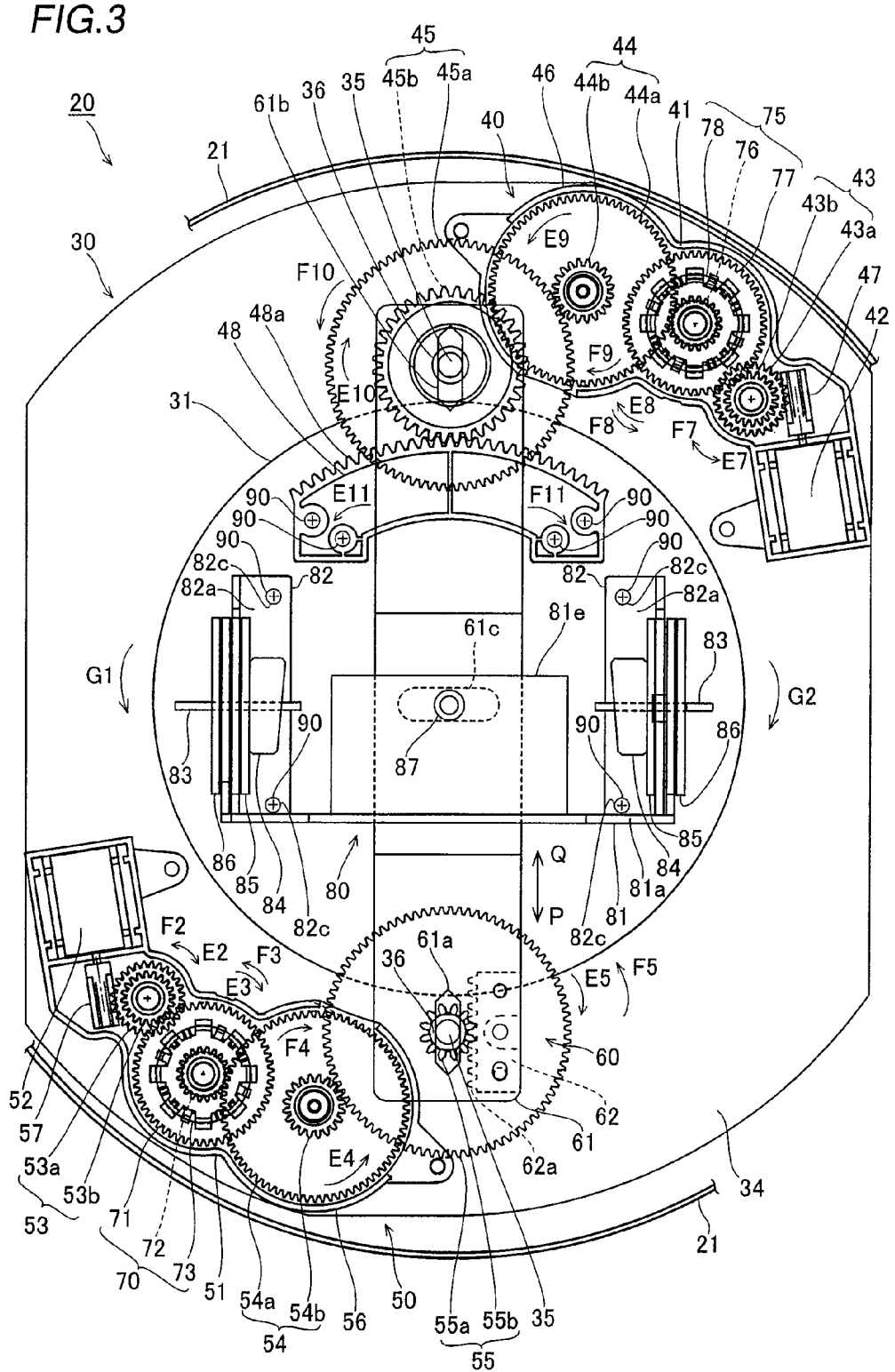
FIG. 3 is a plan view of the display screen turning apparatus according to the first embodiment of the present invention shown in FIG. 1.

As shown in FIG. 3, the display screen turning apparatus 20 comprises a base portion 30 for turning the display body 10 (see FIG. 2) supported with the display screen support mechanism 80 (see FIG. 2) in the horizontal direction (along arrows A and B in FIG. 1) in the horizontal plane, a horizontal turn driving portion 40 turning an after-mentioned turning plate 31 arranged on the base portion 30 in the horizontal direction (along arrows A and B in FIG. 1) and controlling the turning angle of the turning plate 31, and a vertical turn driving portion 50 turning the display body 10 (see FIG. 2) supported with the display screen support mechanism 80 (see FIG. 2) in the anteroposterior direction (along arrows C and D FIG. 1) with respect to the vertical plane by the prescribed angle and controlling the turning angle of the display screen support mechanism 80 (see FIG. 2).

Figure 4:
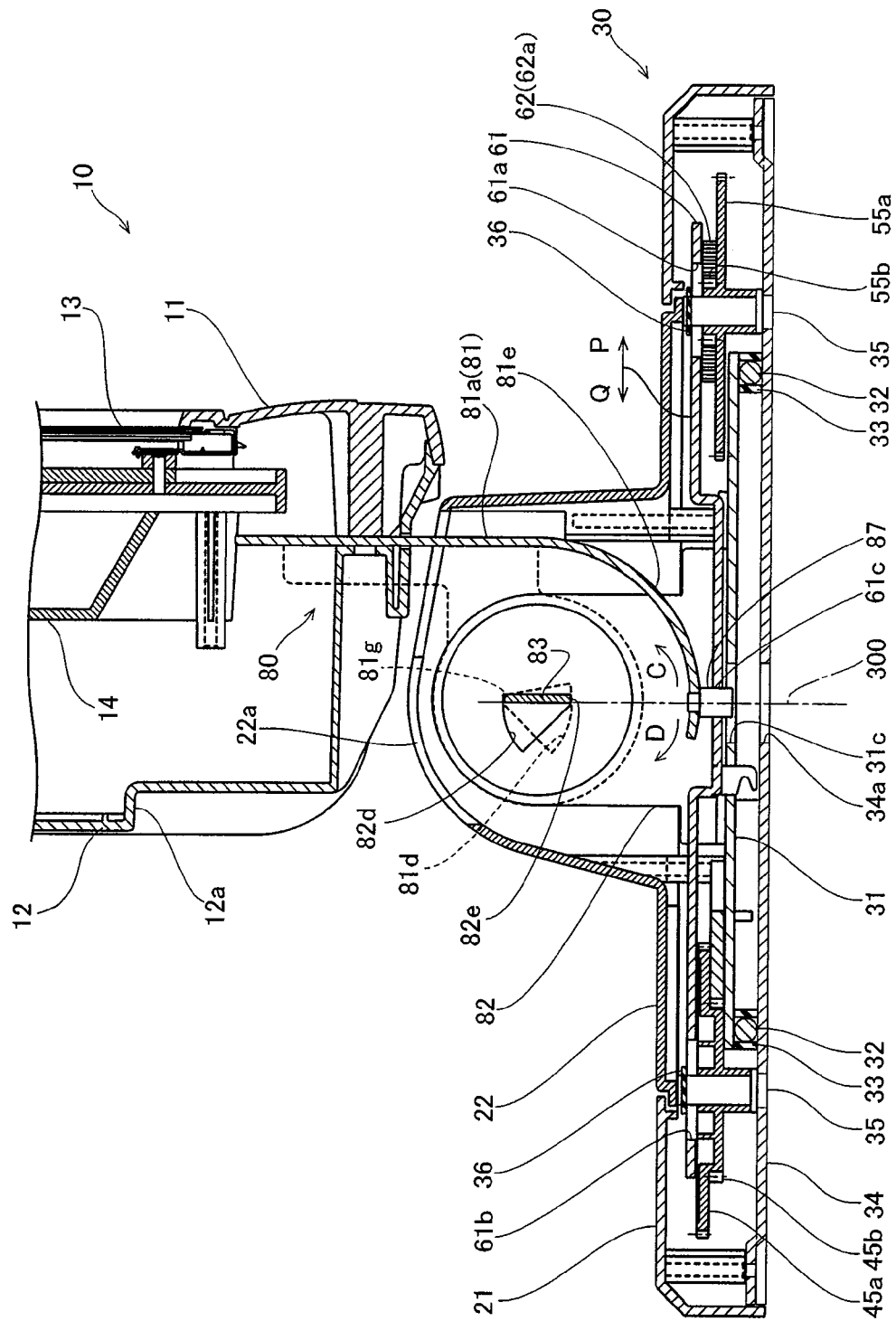
FIG. 4 is a sectional view for illustrating the structure of the display screen turning apparatus according to the first embodiment of the present invention shown in FIG. 1.
Figure 5:
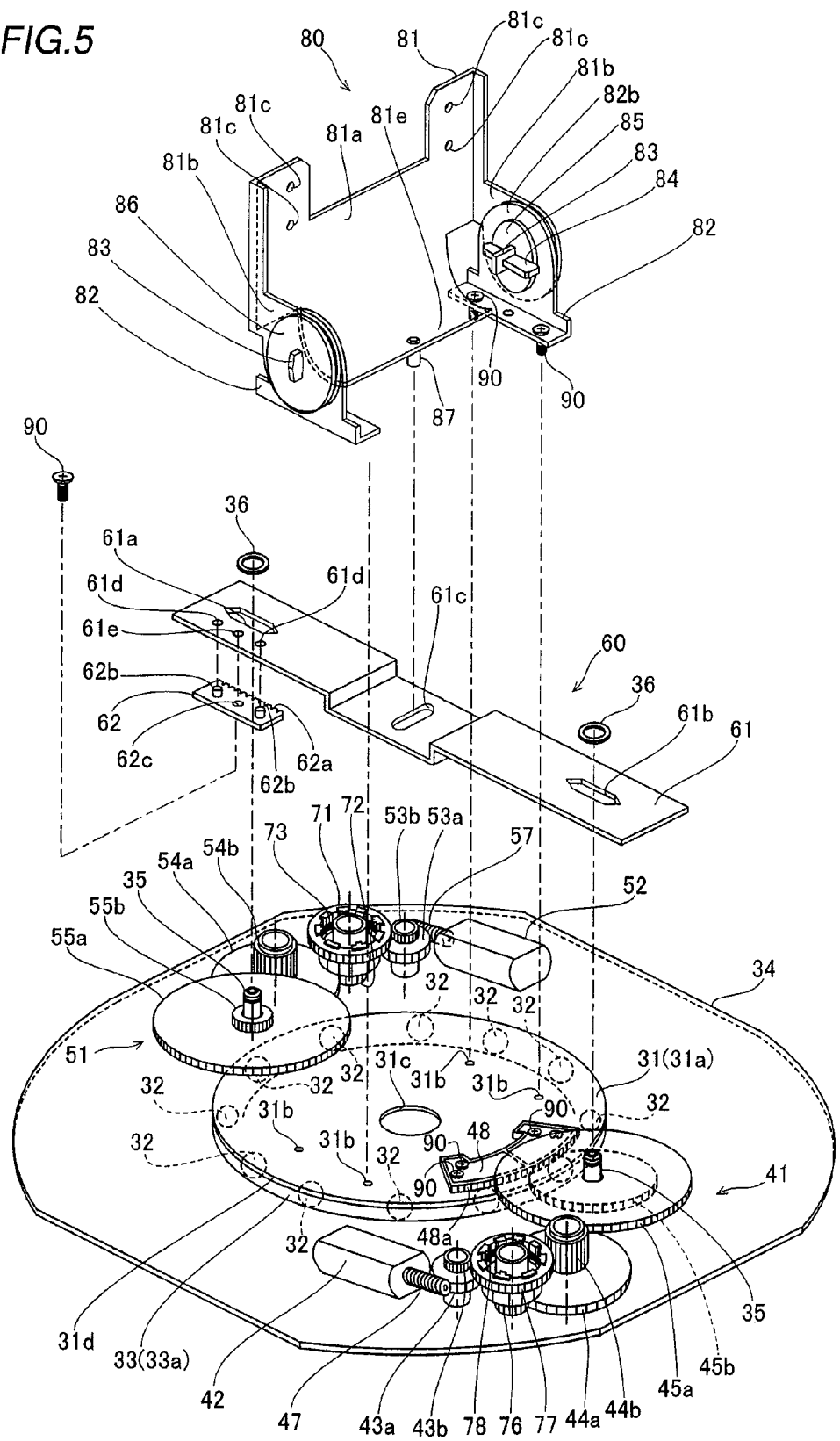
FIG. 5 is an exploded perspective view for illustrating the display screen turning apparatus according to the first embodiment of the present invention shown in FIG. 1 in detail.

As shown in FIGS. 3 to 5, the base portion 30 is constituted by the turning plate 31 made of sheet metal mounted with the display screen support mechanism 80 (see FIG. 2), a guide member 33 (see FIG. 5) made of resin arranged with a plurality of steel balls 32 (see FIG. 5) (twelve in the first embodiment) therein at prescribed intervals (at intervals of about 30° in the first embodiment) and rotatably holding the steel balls 32 (see FIG. 5), a base member 34 made of sheet metal, a support member (not shown) made of metal rotatably supporting the turning plate 31 on the base member 34, boss members 35 made of resin rotatably receiving rotation axes of after-mentioned gears 45 and 55 and reciprocably receiving an after-mentioned rack plate 60 of the vertical turn driving portion 50 in the horizontal plane, and stop ring members 36 of the rack plate 60 inserted around the boss members 35. The boss member 35 is an example of the "support shaft" in the present invention.

According to the first embodiment, the vertical turn driving portion 50 is constituted by a transmission gear portion 51 constituted of a plurality of gear members, a stepping motor 52 serving as a driving source of the transmission gear portion 51, the rack plate 60 for rotating an after-mentioned display screen support member 81 rotatably provided in the display screen support mechanism 80 mounted on the turning plate 31 of the base portion 30 in the anteroposterior direction (along arrows C and D FIG. 1) with respect to the vertical plane, as shown in FIGS. 3 and 5. The vertical turn driving portion 50 is so formed as to be arranged inside the base portion 30 as shown in FIG. 3 to 5. The stepping motor 52 is an example of the "driving source" in the present invention.

Figure 8:
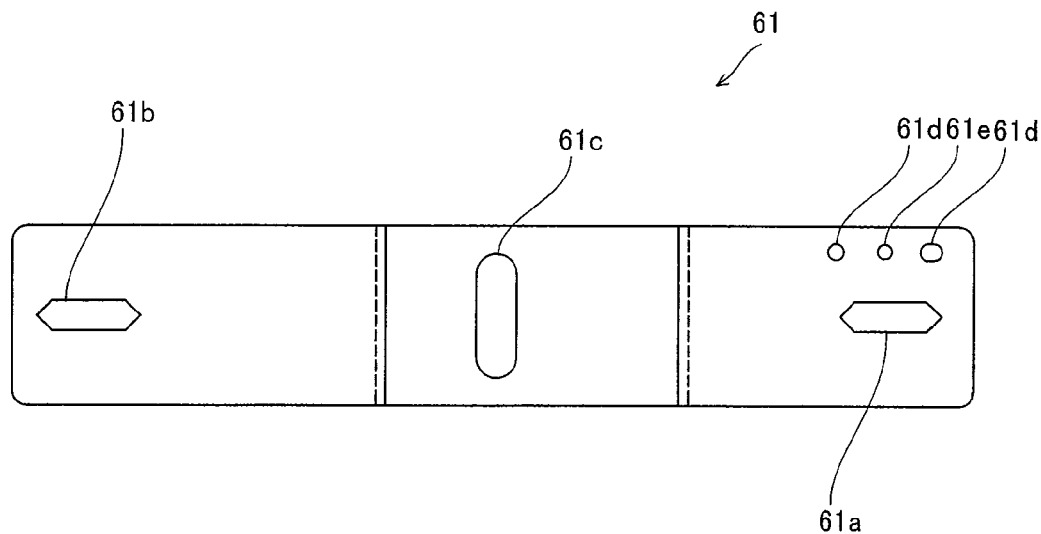
FIG. 8 is a diagram showing a plate member of a rack plate according to the first embodiment of the present invention shown in FIG. 1.

According to the first embodiment, the rack plate 60 is constituted by a plate member 61 made of sheet metal and a rack gear 62 of made of resin, as shown in FIG. 5. The rack gear 62 is mounted on a lower surface side of the plate member 61 with a screw 90 as shown in FIG. 5. The rack gear 62 is meshed with an after-mentioned minor-diametral gear portion 55b of the gear 55 in the horizontal direction as shown in FIG. 3. As shown in FIGS. 5 and 8, the plate member 61 is provided with long holes 61a and 61b extending along a longitudinal direction of the plate member 61 in the vicinity of both ends in the longitudinal direction of the plate member 61 respectively and provided with a slot-shaped engaging hole 61c extending in a direction substantially perpendicular to a direction where the long holes 61a and 61b of the plate member 61 extend on the substantial center of the plate member 61. The long holes 61a and 61b are examples of the "support holes" in the present invention and the engaging hole 61c is an example of the "first engaging portion" in the present invention. The rack plate 60 is so formed as to be reciprocable (slidable) along arrows P and Q when the rack plate 60 is inserted around a pair of the boss members 35 provided in the base member 34 through the long holes 61a and 61b of the plate member 61. Therefore, the rack plate 60 is so formed as to be reciprocable along arrows P and Q on the turning plate 31 by transmitting the normal and reverse rotation of the stepping motor 52 to the rack gear 62 through the transmission gear portion 51. The engaging hole 61c of the plate member 61 is formed such that an after-mentioned engaging member 87 of the display screen support mechanism 80 is engageable with the engaging hole 61c from above and is movable inside the engaging hole 61c in a direction in which the engaging hole 61c extends (horizontal direction), as shown in FIGS. 3 and 5.

Figure 9:
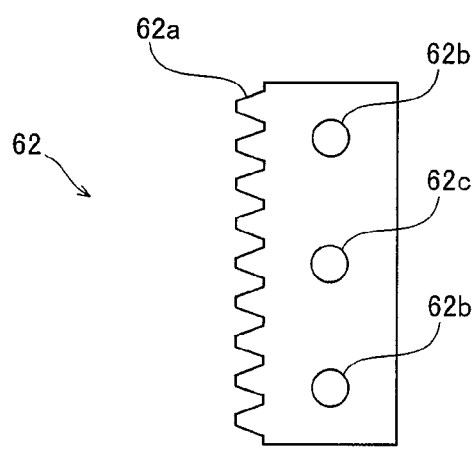
FIG. 9 is a diagram showing a rack gear of the rack plate according to the first embodiment of the present invention shown in FIG. 1.

The plate member 61 includes two positioning holes 61d and a screw mounting hole 61e as shown in FIGS. 5 and 8. The rack gear 62 is formed with a gear portion 62a along a longitudinal first side surface portion and provided with two bosses 62b and one screw receiving hole 62c, as shown in FIGS. 5 and 9. Therefore, the bosses 62b of the rack gear 62 is fitted into the positioning holes 61d of the plate member 61, and the screw 90 is screwed into the screw mounting hole 61e of the plate member 61 through the screw receiving hole 62c of the rack gear 62 so that the rack gear 62 can be mounted on the plate member 61 from below, as shown in FIG. 5.

Figure 6:
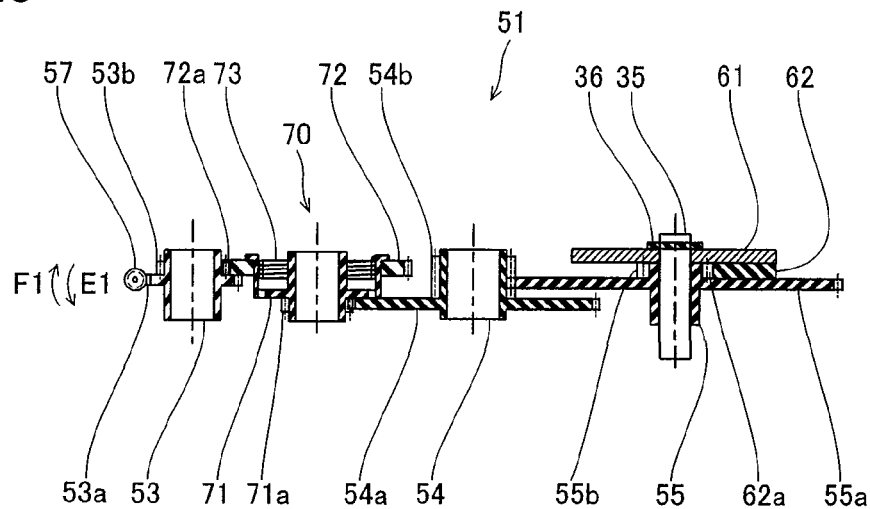
FIG. 6 is a diagram for illustrating an arrangement of a transmission gear portion of a vertical turn driving portion in the display screen turning apparatus according to the first embodiment of the present invention shown in FIG. 1.

According to the first embodiment, as shown in FIG. 3, the transmission gear portion 51 is constituted such that a gear 53 made of resin, a torque limiter 70, a gear 54 made of resin and the gear 55 made of resin are arranged in a gear box 56 made of resin. The torque limiter 70 is constituted by the driven gear 71 made of resin, the drive gear 72 made of resin, and a spring member 73 (coil spring) made of metal, as shown in FIGS. 3 and 6. The torque limiter 70 is constituted such that the rack plate 60 can be reciprocated along arrows P and Q through the transmission gear portion 51 and the rack gear 62 with the driving force of the stepping motor 52 when the driving force of the stepping motor 52 is less than prescribed driving torque, while the driving force of the stepping motor 52 is not transmitted to a reciprocating operation of the rack plate 60 when the driving force of the stepping motor 52 is prescribed driving torque or more, as shown in FIG. 3.

As shown in FIGS. 3 and 6, the gear 53 made of resin integrally includes a major-diametral gear portion 53a and a minor-diametral gear portion 53b. The gear 54 made of resin integrally includes a major-diametral gear portion 54a and a minor-diametral gear portion 54b. The gear 55 made of resin integrally includes the major-diametral gear portion 55a and the minor-diametral gear portion 55b.

According to the first embodiment, a worm gear 57 made of resin is press-fitted into the rotational axis of the stepping motor 5 as shown in FIGS. 3 and 5. As shown in FIGS. 3 and 6, the worm gear 57 is meshed with the major-diametral gear portion 53a of the gear 53 perpendicular to the rotational axis. Therefore, driving force resulting from the stepping motor 52 is transmitted to the gear 53 through the worm gear 57, while the worm gear 57 and the stepping motor 52 can not be rotated with driving force resulting from the gear 53 and the gears following the gear 53. In other words, only the driving force resulting from the stepping motor 52 is transmitted to the transmission gear portion 51 with the worm gear 57.

As shown in FIGS. 5 and 6, the minor-diametral gear portion 53b of the gear 53 is meshed with a gear portion 72a of the drive gear 72 of the torque limiter 70 parallel to the rotational axis. As shown in FIGS. 5 and 6, a gear portion 71a of the driven gear 71 of the torque limiter 70 is meshed with the major-diametral gear portion 54a of the gear 54 parallel to the rotational axis and the minor-diametral gear portion 54b of the gear 54 is meshed with the major-diametral gear portion 55a of the gear 55 parallel to the rotational axis. As shown in FIGS. 5 and 6, the minor-diametral gear portion 55b of the gear 55 is horizontally meshed with the gear portion 62a of the rack gear 62. Therefore, the driving force of the stepping motor 52 is transmitted to the rack plate 60 through the worm gear 57, the gear 53, the torque limiter 70, the gear 54, the gear 55 and the rack gear 62 from arrangement of the aforementioned gear members shown in FIGS. 5 and 6. Referring to FIGS. 5 and 6, the gear box 56 (see FIG. 3) for arranging the transmission gear portion 51 and the stepping motor 52 therein is not shown in the drawing in order to describe the arrangement of the transmission gear portion 51.

Figure 10:
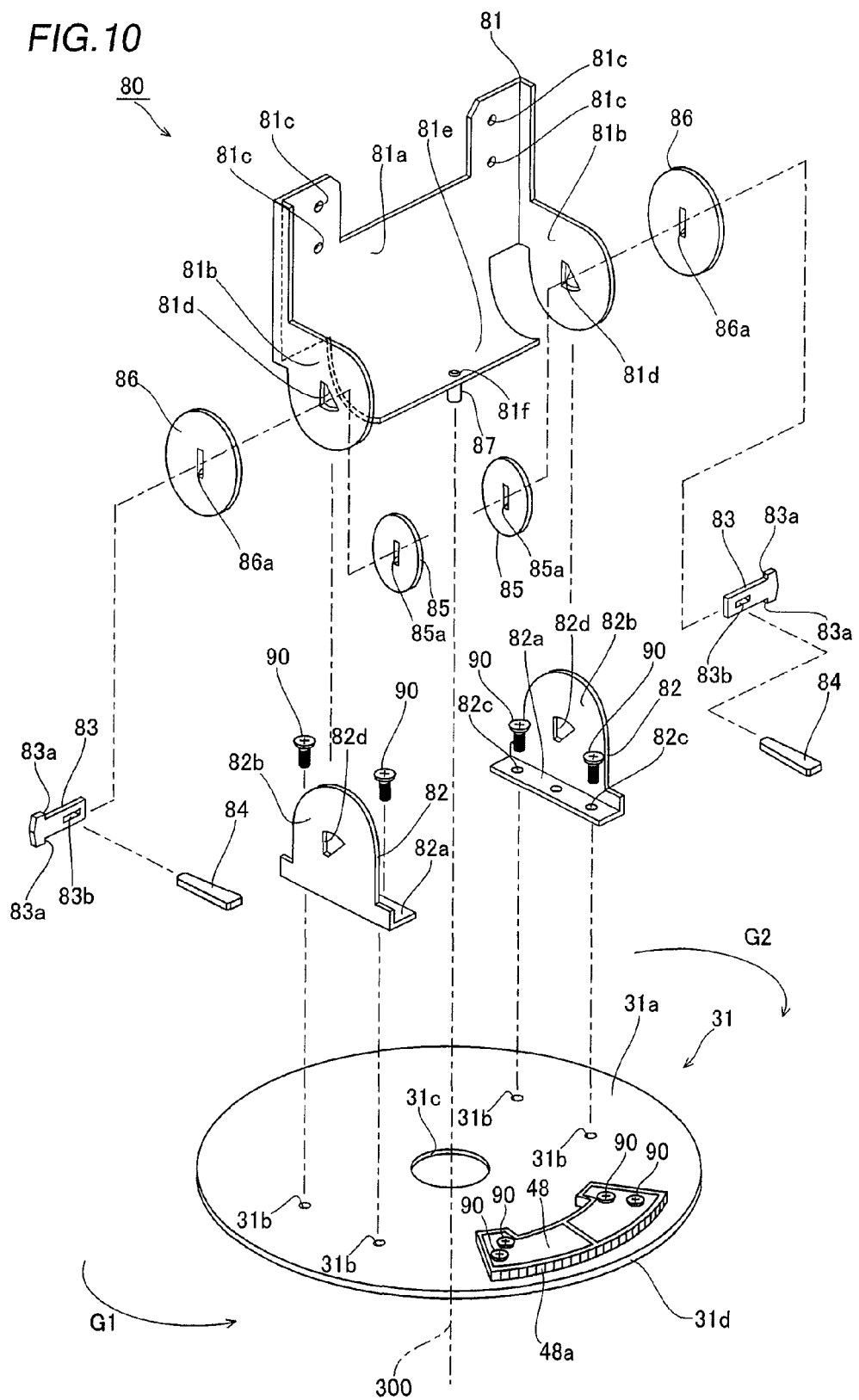
FIG. 10 is an exploded perspective view showing a structure of a display screen support mechanism and a turning plate according to the first embodiment of the present invention shown in FIG. 1.

As shown in FIGS. 5 and 10, the turning plate 31 of the base portion 30 includes four screws receiving holes 31b provided on an upper surface 31a and a hole 31c provided on the center of the upper surface 31a (in the vicinity of the rotation center point of the turning plate 31). As shown in FIG. 3, the turning plate 31 is arranged substantially on the center of the base member 34, and a plurality of support members (not shown) so provided on the base member 34 as to circularly surround the turning plate 31 are rotatably held by coming into surface contact with an outer peripheral surface 31d (see FIG. 5) of the turning plate 31 and the outer peripheral surface 33a (see FIG. 5) of the guide member 33 (see FIG. 5).

The display screen support mechanism 80 is fixed to the screw receiving holes 31b of the turning plate 31 of the base portion 30 with the four screws 90 as shown in FIG. 2, for rendering the display body 10 rotatable in the anteroposterior direction (along arrows C and D) with respect to the vertical plane of the display screen turning apparatus 20 while supporting the display body 10 in a state inclined by the prescribed angle in the anteroposterior direction (along arrows C and D) with respect to the vertical plane of the display screen turning apparatus 20, as shown in FIG. 1.

The display screen support mechanism 80 is constituted by a display screen support member 81 made of sheet metal, a pair of vertical support members 82, platelike support shafts 83 made of sheet metal, stop members 84 of sheet metal, pressure-contact plates 85 and 86 of sheet metal, and the engaging member 87 engaged with the engaging hole 61c of the rack plate 60 as shown in FIGS. 2 and 3. The pressure-contact plates 85 and 86 are provided with rectangular holes 85a and 86a for receiving the support shafts 83 respectively. As shown in FIG. 2, the display screen support member 81 is mounted on the pair of vertical support members 82 so as to be rotatable at prescribed torque or more.

Figure 12:
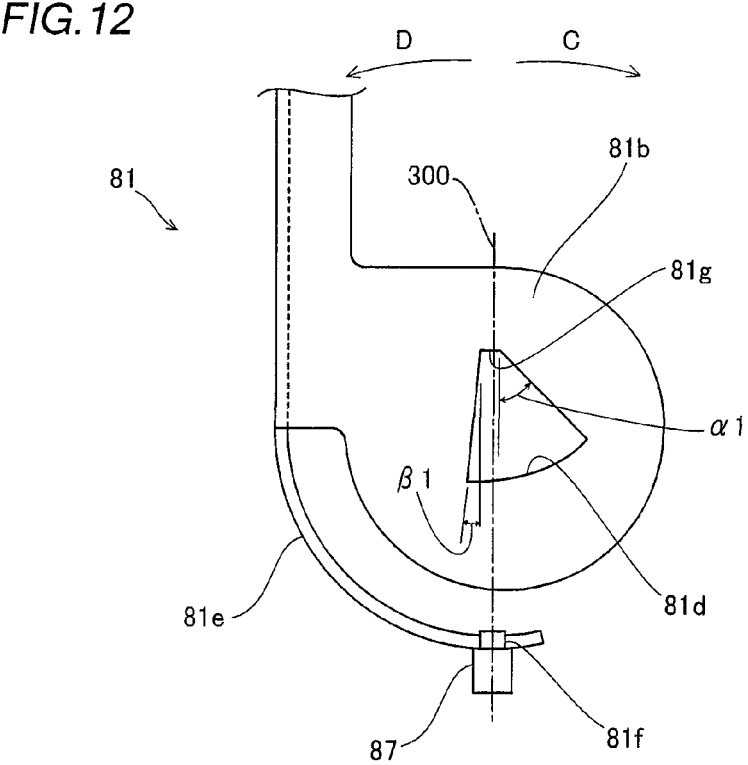
FIG. 12 is a front view of a display screen support member of the display screen support mechanism according to the first embodiment of the present invention shown in FIG. 2.

The display screen support member 81 made of sheet metal integrally includes a display body mounting portion 81a and a pair of rotating portions 81b as shown in FIG. 2. The display body mounting portion 81a of the display screen support member 81 is provided with four screws receiving holes 81c. The pair of rotating portions 81b of the display screen support member 81 are so provided as to extend from both side ends of the display body mounting portion 81a in a vertical direction with respect to a surface of the display body mounting portion 81a respectively. As shown in FIGS. 10 and 12, sectorial holes 81d are provided in the vicinity of the rotation centers of the pair of rotating portions 81b respectively. As shown in FIGS. 10 and 12, the display screen support member 81 is integrally formed with an arm portion 81e extending downward from the display body mounting portion 81*a* along outer periphery of the rotating portions 81*b*.

According to the first embodiment, a receiving hole 81*f* for mounting the engaging member 87 substantially on the center of the arm portion 81*e*, located at the lowest part of the arm portion 81*e* is provided, as shown in FIGS. 10 and 12. As shown in FIG. 10, the engaging member 87 is so mounted into the receiving hole 81*f* by calking as to be arranged on a vertical segment 300 (shown by a one-dot chain line) passing the rotation center (showing the rotation center of the turning plate 31) in the horizontal direction (along arrows G1 and G2) in the horizontal plane of the display screen support member 81.

Figure 11:
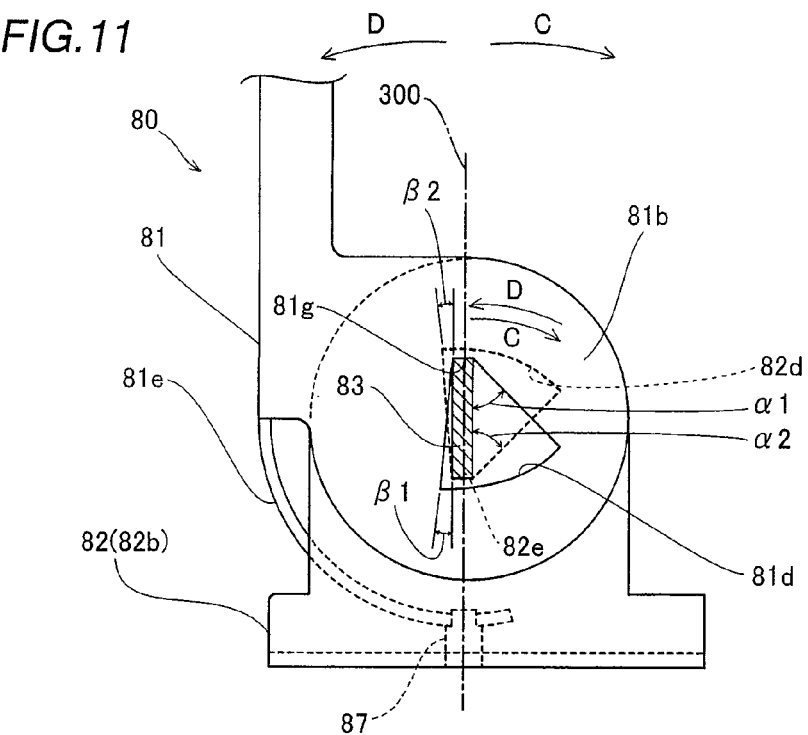
FIG. 11 is a sectional view taken along the line 200-200 in FIG. 2.

As shown in FIGS. 10 and 11, the sectorial holes 81*d* are provided for receiving the platelike support shafts 83. Further, the sectorial holes 81*d* are so arranged as to locate base portions 81*g* closer to the circle centers upward as shown in FIG. 12, so that the base portions 81*g* closer to the circle centers come into contact with the upper surfaces of the support shafts 83. Thus, the base portions 81*g* of the sectorial holes 81*d* receive the vertical load of the display body 10 through the display screen support member 81. Further, the sectorial holes 81*d* have central angles α1 (about 45°) and β1 (about 5°) opening toward different sides from the vertical direction, as shown in FIGS. 11 and 12. The display screen support member 81 is rotatable about the base portions 81*g* of the sectorial holes 81*d* supported by the platelike support shafts 83 in a sectorial angular range (α1+β1=about 50° in the first embodiment) with respect to the support shafts 83. In other words, the platelike support shafts 83 function as the rotation axes of the display screen support member 81.

Figure 13:
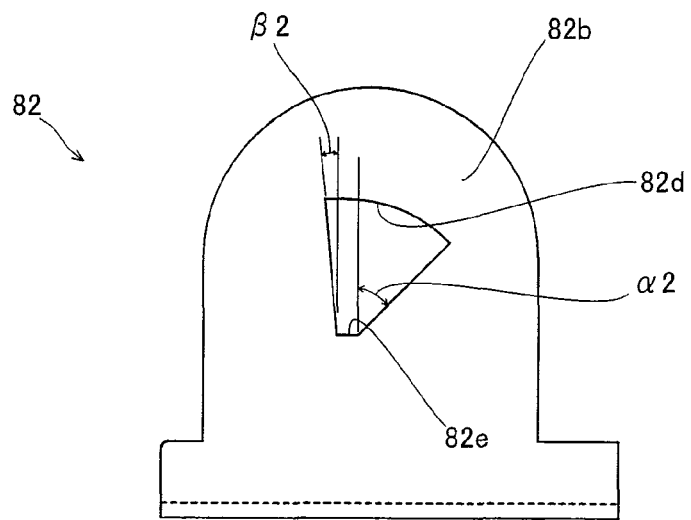
FIG. 13 is a front elevational view of a vertical support member of the display screen support mechanism according to the first embodiment of the present invention shown in FIG. 2.

The pair of vertical support members 82 include turning plate mounting portions 82*a* and rotating portion mounting portions 82*b* respectively, as shown in FIGS. 10 and 13. The turning plate mounting portions 82*a* of the vertical support members 82 are provided with four screws receiving holes 82*c* (see FIG. 3). The rotating portion mounting portions 82*b* of the vertical support members 82 are so provided as to extend upward in the vertical direction with respect to the surfaces of the turning plate mounting portions 82*a* from first ends of the turning plate mounting portion 82*a*.

As shown in FIG. 13, sectorial holes 82*d* are provided in the rotating portion mounting portions 82*b* of the vertical support members 82. The sectorial holes 82*d* are provided for receiving the platelike support shafts 83, as shown in FIGS. 10 and 11. Further, the sectorial holes 82*d* are so arranged as to locate base portions 82*e* closer to the circle centers downward as shown in FIG. 13, so that the base portions 82*e* come into contact with the lower surfaces of the support shafts 83. Thus, the base portions 82*e* of the sectorial holes 82*d* receive the vertical load of the display body 10 through the display screen support member 81 and the support shafts 83. In other words, the base portions 81*g* of the sectorial holes 81*d* of the display screen support member 81 and the holes 82*d* of the vertical support members 82 receive the vertical load of the display body 10, according to the first embodiment. Further, the sectorial holes 82*d* have central angles α2 (about 45°) and β2 (about 5°) opening toward different sides from the vertical direction, as shown in FIGS. 10 and 12. The support shafts 83 are rotatable about the base portions 82*e* of the sectorial holes 82*d* in a sectorial angular range (α2+β2=about 50° in the first embodiment) with respect to the vertical support members 82.

The platelike support shafts 83 made of sheet metal include pairs of contact portions 83*a* and rectangular holes 83*b* respectively, as shown in FIG. 10. The pairs of contact portions 83*a* of the support shafts 83 are so provided as to protrude from rear ends of both side surfaces of the support shafts 83 extending in the longitudinal direction. These contact portions 83*a* are provided for coming into contact with the pressure-contact plates 86 closer to the display screen support member 81, as shown in FIGS. 2 and 10. The rectangular holes 83*b* of the support shafts 83 are provided for receiving the stop members 84 as shown in FIGS. 2 and 10.

Figure 14:
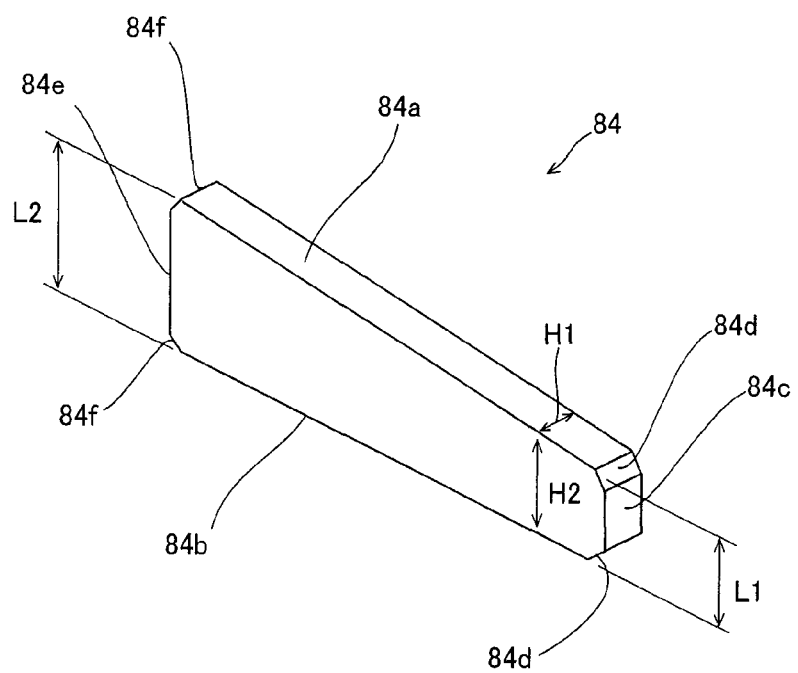
FIG. 14 is a diagram showing a stop member of the display screen support mechanism according to the first embodiment of the present invention shown in FIG. 1.

As shown in FIG. 14, each stop member 84 made of sheet metal has a tapered shape formed by an end surface portion 84*a* and an end surface portion 84*b*, and includes chamfer 84*d* provided on a first side surface 84*c* extending in a longitudinal direction and a chamfer 84*f* provided on a second side surface 84*e* extending in the longitudinal direction. As shown in FIG. 14, the length L1 of the first side surface 84*c* of each stop member 84 is smaller than the length L2 of each second side surface 84*e*, and distance between each end surface portion 84*a* and each end surface portion 84*b* (length in a direction H2 perpendicular to a thickness direction H1 of each stop member 84) is linearly changed from L1 to L2. Thus, the stop members 84 formed in the (tapered) wedged manner can be easily inhibited from slipping off when inserted into the rectangular holes 83*b* (see FIG. 10) provided in the platelike support shafts 83, as shown in FIG. 2. The chamfers 84*b* are provided such that the stop members 84 can be easily inserted into the rectangular holes 83*b* (see FIG. 10) provided in the support shafts 83.

As shown in FIGS. 3 and 5, the horizontal turn driving portion 40 is constituted by a transmission gear portion 41 for rotating the turning plate 31 on the base portion 30 in the horizontal direction (along arrows A and B in FIG. 1) in the horizontal plane and a stepping motor 42 serving as a driving source of the transmission gear portion 41. The horizontal turn driving portion 40 is so formed as to be arranged in the base portion 30 as shown in FIGS. 3 and 4. As shown in FIG. 3, the transmission gear portion 41 is constituted such that a gear 43 made of resin, a torque limiter 75, a gear 44 made of resin and the gear 45 made of resin are arranged in a gear box 46 made of resin.

Figure 7:
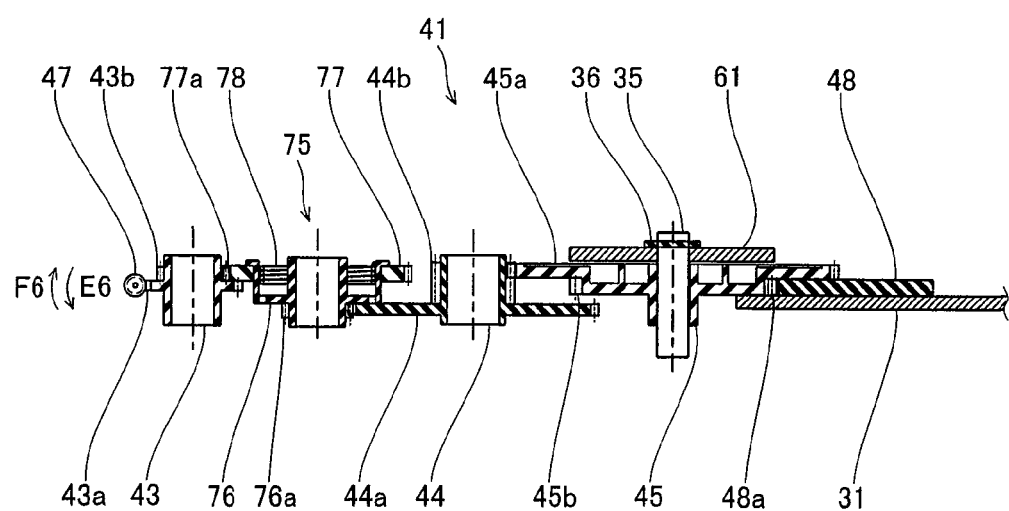
FIG. 7 is a diagram for illustrating an arrangement of a transmission gear portion of a horizontal turn driving portion in the display screen turning apparatus according to the first embodiment of the present invention shown in FIG. 1.

As shown in FIG. 5, a worm gear 47 made of resin is press-fitted into the rotational axis of the stepping motor 42. As shown in FIGS. 5 and 7, the gear 43 integrally includes a major-diametral gear portion 43*a* and a minor-diametral gear portion 43*b*. The gear 44 integrally includes a major-diametral gear portion 44*a* and a minor-diametral gear portion 44*b*. The gear 45 integrally includes a major-diametral gear portion 45*a* and a minor-diametral gear portion 45*b*. As shown in FIGS. 3 and 5, a turning gear member 48 made of resin is fixed on the upper surface 31*a* of the turning plate 31 of the base portion 30 with four screws 90. Referring to FIGS. 5 and 7, the gear box 46 (see FIG. 3) for arranging the transmission gear portion 41 and the stepping motor 42 therein is not shown in the drawing in order to describe the arrangement of the transmission gear portion 41.

As shown in FIGS. 5 and 7, the worm gear 47 is meshed with the major-diametral gear portion 43*a* of the gear 43 perpendicular to the rotational axis and the minor-diametral gear portion 43*b* of the gear 43 is meshed with a gear portion 77*a* of a drive gear 77 of the torque limiter 75 parallel to the rotational axis. As shown in FIGS. 5 and 7, a gear portion 76*a* of a driven gear 76 of the torque limiter 75 is meshed with the major-diametral gear portion 44*a* of the gear 44 parallel to the rotational axis and the minor-diametral gear portion 44*b* of the gear 44 is meshed with the major-diametral gear portion 45*a* of the gear 45 parallel to the rotational axis. As shown in FIGS. 5 and 7, the minor-diametral gear portion 45*b* of the gear 45 is meshed with a turning gear portion 48*a* of the turning gear member 48 parallel to the rotational axis. Therefore, the driving force of the stepping motor 42 is transmitted to the turning plate 31 through the worm gear 47, the gear 43, the torque limiter 75, the gear 44, the gear 45 and the turning gear member 48 from arrangement of the aforementioned gear members shown in FIGS. 5 and 7.

The torque limiter 75 is constituted by a driven gear 76 made of resin, a drive gear 77 made of resin and a spring member 78 (coil spring) made of metal, as shown in FIGS. 3 and 7. As shown in FIG. 3, the torque limiter 75 is constituted such that the driving force of the stepping motor 42 is transmitted to the turning plate 31 of the base portion 30 through the transmission gear portion 41 to turn the turning plate 31 inside the display screen turning apparatus 20 when the driving force of the stepping motor 42 is less than prescribed driving torque, while the driving force of the stepping motor 42 is not transmitted to the turning plate 31 of the base portion 30 when the driving force of the stepping motor 42 is prescribed driving torque or more.

As shown in FIGS. 1 and 2, the display body 10 is constituted by a front cabinet 11 made of resin and a rear cabinet 12 made of resin. A liquid crystal module 14 (see FIG. 4) mounted with a liquid crystal panel 13 (see FIG. 4) is so formed inside the display body 10 as to be surrounded by the front cabinet 11 and the rear cabinet 12. The display body 10 is mounted on the display screen support member 81 by fastening the screws 70 to screw mounting holes (not shown) of the rear cabinet 12 through the screw receiving holes 81*a* of the display screen support member 81. The rear cabinet 12 is integrally provided with a notch 12*a* for arranging the display screen support member 81 in a concealed manner. A plurality of screw receiving holes 12*b* (seven portions in the first embodiment) are provide on an outer peripheral portion of the rear cabinet 12 so that the rear cabinet 12 is mounted on the front cabinet 11 through screws 91. As shown in FIG. 2, a rectangular recess portion 12*d* is formed in a side surface portion 12*c* of the rear cabinet 12 and is formed with a plurality of through-holes 12*e*. The plurality of through-holes 12*e* are provided for connecting cables from AV terminals (not shown) connected to control boards (not shown) for controlling the liquid crystal module 13 to an external apparatus of the display body 10.

In the display screen turning apparatus 20, a cover member 21 made of resin is mounted on the base member 34 with screws (not shown) inserted from a lower surface side of the base member 34 of the base portion 30, as shown in FIGS. 1 and 4. A cover member 22 made of resin is so mounted on the upper surface 31*a* of the turning plate 31 with screws (not shown) as to cover the base portion 30 from above and be turnable integrally with the turning plate 31 of the base portion 30 in the horizontal direction (along arrows A and B in FIG. 1). As shown in FIGS. 2 and 4, the cover member 22 made of resin is provided with a notch 22*a* for rotatably arranging the display screen support mechanism 80 (display screen support member 81) in the anteroposterior direction (along arrows C and D in FIG. 1).

Turning operations of the display screen turning apparatus 20 according to the first embodiment in the anteroposterior direction and the horizontal direction will be now described with reference to FIGS. 1, 3, 4, 6, 7, 10, 11 and 15 to 25.

As shown in FIG. 4, when the display screen turning apparatus 20 rotates the display screen support mechanism 80 in the anteroposterior direction (along arrows C and D) with respect to the vertical plane, the liquid crystal panel 13 of the display body 10 rotates upward and downward. Therefore, the anteroposterior direction is referred to as a vertical direction in the following description of the operation.

The turning operation of the display screen turning apparatus 20 in the vertical direction (along arrows C and D in FIG. 1) will be now described.

As shown in FIG. 3, a user presses an upward tilt button (not shown) of an attached remote control (not shown) in a state where the display screen support member 81 is perpendicular to the turning plate 31 on the base portion 30 and directed frontward (state where the central portion of the turning gear portion 48*a* of the turning gear member 48 is meshed with the minor-diametral gear portion 45*b* of the gear 45), whereby a signal turning the display body 10 (see FIG. 1) upward (along arrow C in FIG. 1) is transmitted to a control circuit portion (not shown) of the display body 10. The stepping motor 52 of the display screen turning apparatus 20 is driven on the basis of this signal. More specifically, the worm gear 57 mounted on the stepping motor 52 rotates along arrow E1 (see FIG. 6) following the drive of the stepping motor 52, and the drive gear 72 of the torque limiter 70 rotates along arrow E3 through the gear 53, as shown in FIG. 3. Similarly, the driven gear 71 of the torque limiter 70 rotates along arrow E3 and the gear 55 rotates along arrow E5 through the gear 54, as shown in FIG. 3.

According to the first embodiment, the plate member 61 of the rack plate 60 starts moving along arrow P along with the rack gear 62 horizontally meshed with the gear 55 following the rotation of the gear 55 along arrow E5, as shown in FIG. 3. Thus, the engaging member 87 of the display screen support member 81 engaged with the engaging hole 61C of the plate member 61 starts rotating along arrow C as shown in FIG. 4, and hence the display body 10 mounted on the display screen support member 81 starts turning upward (along arrow C).

Figure 16:
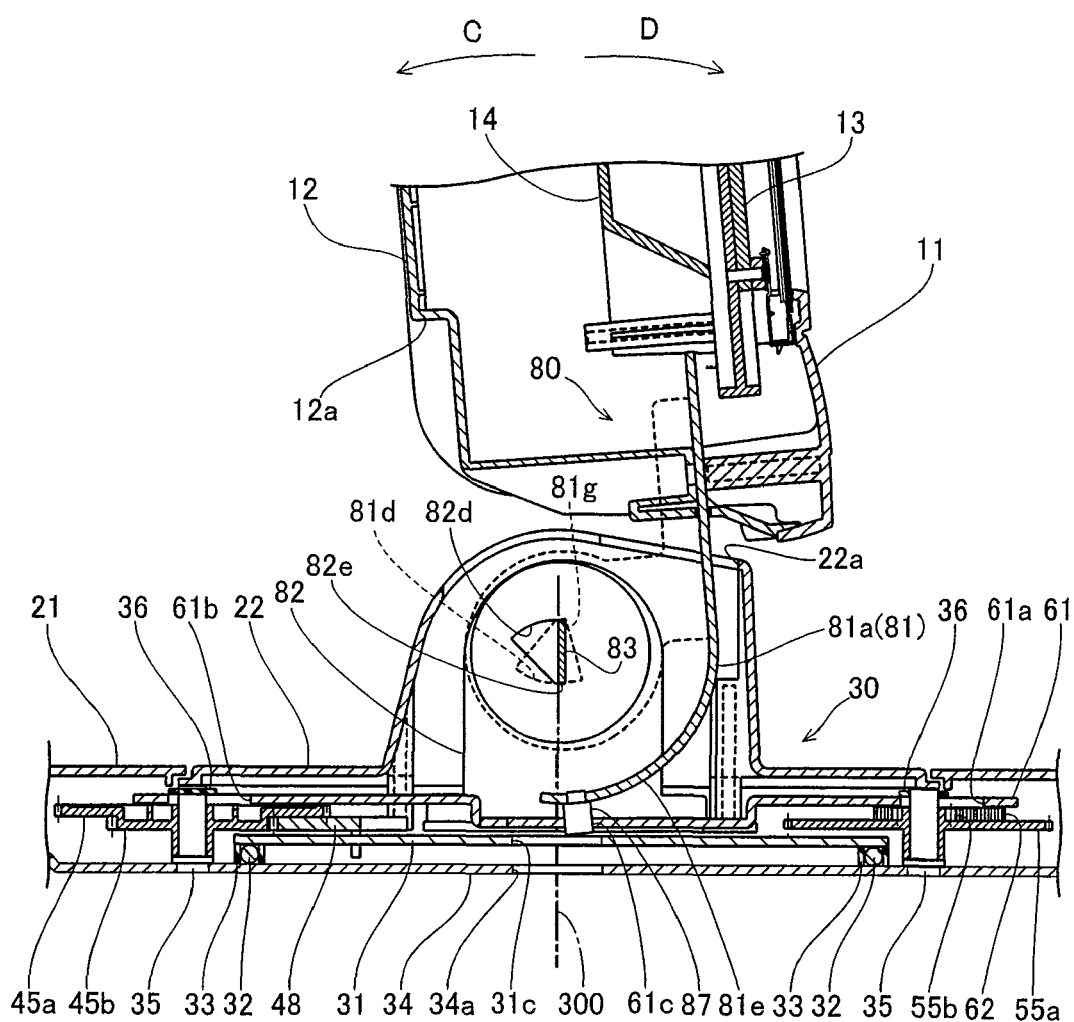

At this time, the display screen support member 81 and the support shafts 83 integrally rotates along arrow C about the base portions 82*e* of the sectorial holes 82*d* of the vertical support members 82 while the base portions 81*g* of the sectoral holes 81*d* of the display screen support member 81 and the upper surfaces of the support shafts 83 come into contact with each other, as shown in FIG. 11. The display screen support member 81 mounted with the display body 10 continuously turns along arrow C at a prescribed turning speed following the drive of the stepping motor 52 (see FIG. 3) as shown in FIG. 16.

When the display body 10 is turned along arrow C in FIG. 4 by an angle desired by the user, the user releases the press of the upward tilt button (not shown) of the attached remote control (not shown) so that the signal turning the display body 10 (see FIG. 1) upward (along arrow C in FIG. 4) is not transmitted to the control circuit portion (not shown) of the display body 10. Therefore, the drive of the stepping motor 52 is stopped. Thus, the display screen support member 81 stops turning along arrow C at a position shown in FIG. 16 and stands still.

Figure 15:
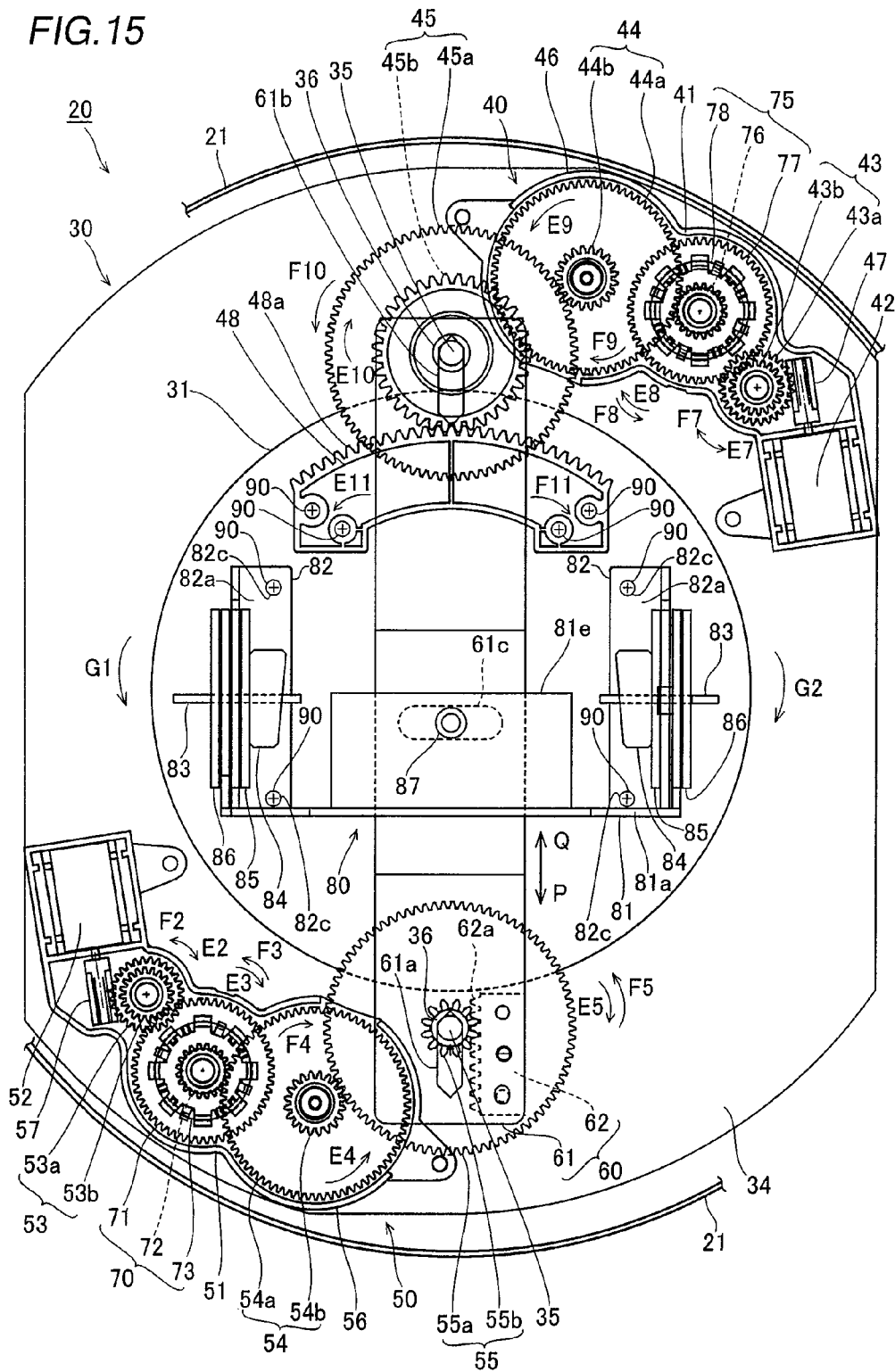
FIGS. 15 to 20 are diagrams for illustrating a turning operation of the display screen turning apparatus according to the first embodiment of the present invention shown in FIG. 1 in the anteroposterior (vertical) direction.
Figure 17:
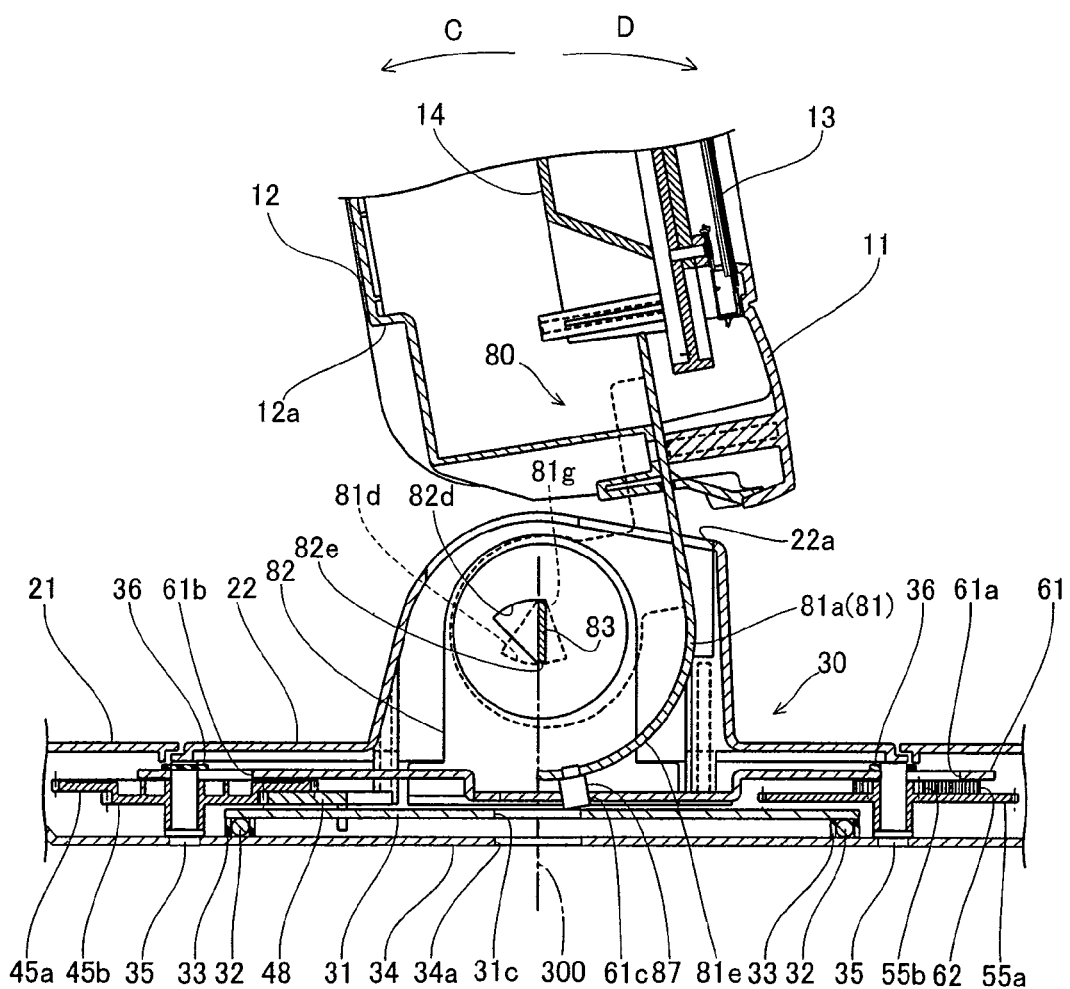

The rack plate 60 is slid along arrow P and first ends of inner side surfaces of the long holes 61*a* and 61*b* of the plate member 61 come into contact with side surfaces of the boss members respectively in a state where the display body 10 (see FIG. 16) is continuously turned upward (along arrow C in FIG. 16) by the user, whereby the rack plate 60 is inhibited from sliding along arrow P. At this time, the display screen support member 81 reaches the prescribed turning angle (10° in the first embodiment) as shown in FIG. 17. Therefore, the display body 10 stops turning along arrow C at a position shown in FIG. 17 and stands still at this position. At this time, the stepping motor 52 (see FIG. 15) continuously drives and hence driving torque transmitted from the stepping motor 52 (see FIG. 15) is transmitted to the drive gear 72 (see FIG. 15)

of the torque limiter 70 (see FIG. 15) through the worm gear 57 (see FIG. 15) and the gear 53 (see FIG. 15).

As shown in FIG. 6, the drive gear 72 is pressed against the driven gear 71 with the urging force previously set by the spring member 73, and therefore the inner peripheral surface of the drive gear 72 and the outer peripheral surface of the driven gear 71 slip so that the driving torque of the drive gear 72 is not transmitted to the driven gear 71, when driving torque, which is not less than the frictional force between the inner peripheral surface of the drive gear 72 and the outer peripheral surface of the driven gear 71 following the pressure contact force of the spring member 73, occurs with respect to the drive gear 72. In other words, the driven gear 71, the gears 54 and 55 stop rotation regardless of the rotation of the drive gear 72, when the rack plate 60 stops moving (sliding) along arrow P as shown in FIG. 15.

As shown in FIG. 3, the user presses a downward tilt button (not shown) of the attached remote control (not shown) in the state where the display screen support member 81 is perpendicular to the turning plate 31 on the base portion 30 and directed frontward, whereby a signal turning the display body 10 (see FIG. 1) downward (along arrow D in FIG. 1) is transmitted to the control circuit portion (not shown) of the display body 10 and the stepping motor 52 of the display screen turning apparatus 20 is driven. More specifically, the worm gear 57 mounted on the stepping motor 52 rotates along arrow F1 (see FIG. 6) following the drive of the stepping motor 52, and the drive gear 72 of the torque limiter 70 rotates along arrow F3 through the gear 53, as shown in FIG. 3. The driven gear 71 of the torque limiter 70 rotates along arrow F3 and the gear 55 rotates along arrow F5 through the gear 54 as shown in FIG. 3. The plate member 61 moves along arrow Q along with the rack gear 62, as shown in FIG. 3. Thus, the engaging member 87 engaged with the engaging hole 61c of the rack plate 60 starts rotating along arrow D as shown in FIG. 4, and hence the display body 10 mounted on the display screen support member 81 starts turning downward (along arrow D) at a prescribed rotational speed.

Figure 19:
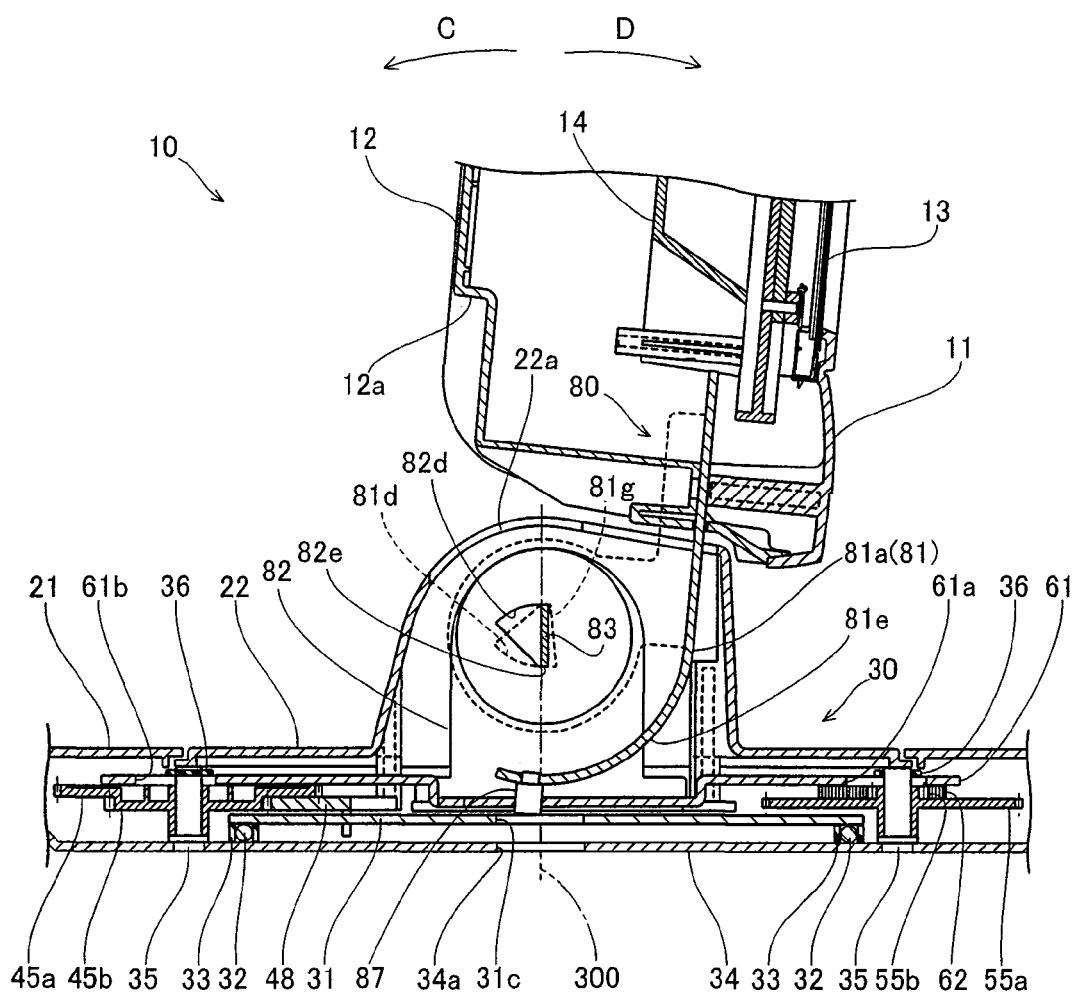

At this time, the base portions 81g of the sectorial holes 81d of the display screen support member 81 come into contact with the upper surfaces of the support shafts 83, so that the display screen support member 81 and the support shafts 83 integrally start rotating along arrow D about the base portions 82e of the sectorial holes 82d of the vertical support members 82, as shown in FIG. 11. When the display screen support member 81 and the support shafts 83 rotate by about 5° (angle β2 in FIG. 11), the support shafts 83 come into contact with second edges of the sectorial holes 82d of the vertical support members 82, as shown in FIG. 19. When the display screen support member 81 is further rotated along arrow D in this state, the display screen support member 81 continuously rotates about the base portions 81e of the sectorial holes 81d along arrow D with respect to the support shafts 83, as shown in FIG. 19.

When the display body 10 is turned along arrow D in FIG. 4 by an angle desired by the user, the user releases the press of the downward tilt button (not shown) of the attached remote control (not shown) so that the signal turning the display body 10 (see FIG. 4) upward (along arrow D in FIG. 4) is not transmitted to the control circuit portion (not shown) of the display body 10, and hence the drive of the stepping motor 52 is stopped. Thus, the display screen support member 81 stops turning along arrow D at a position shown in FIG. 19 and stands still.

Figure 18:
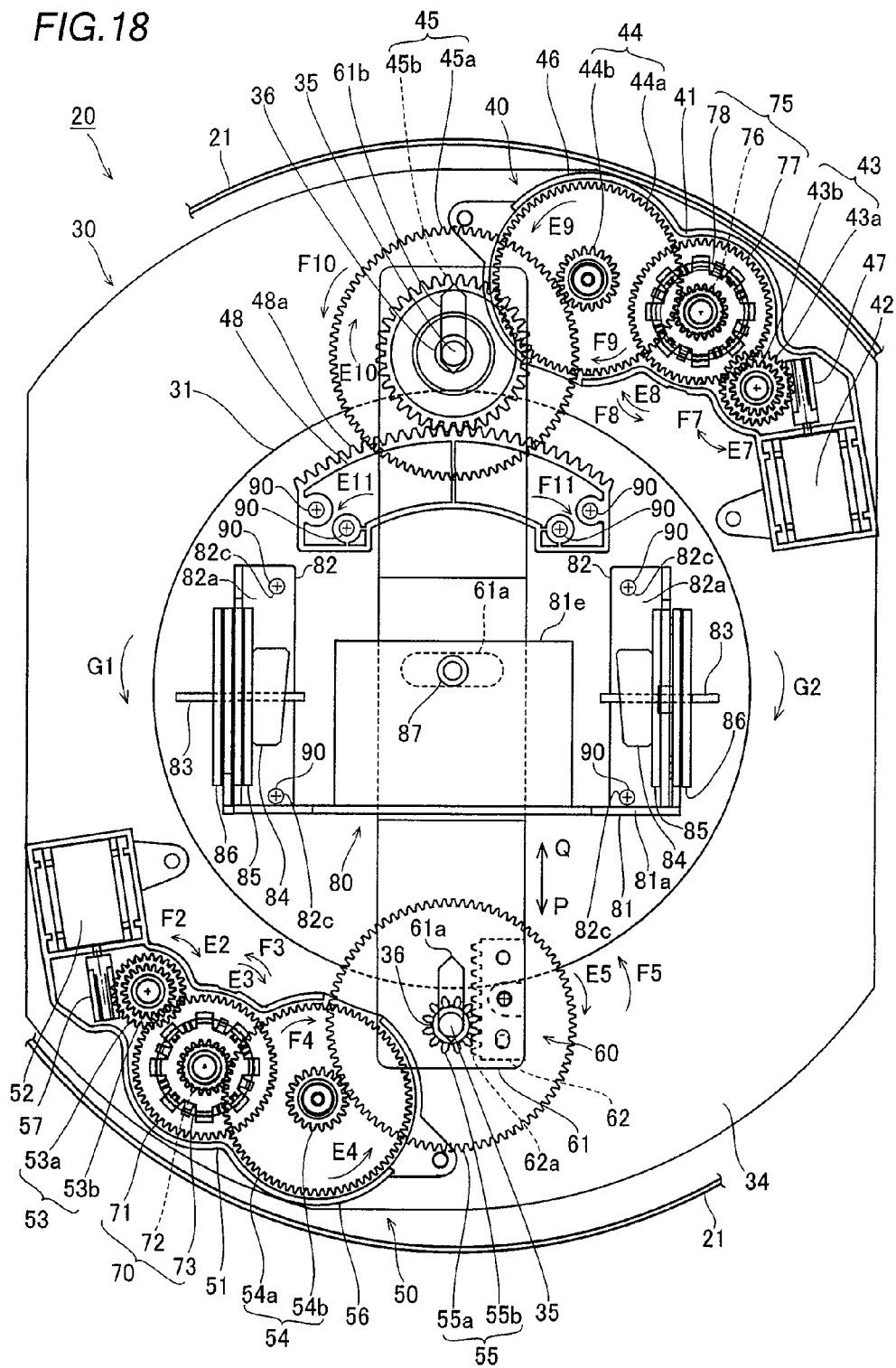
Figure 20:
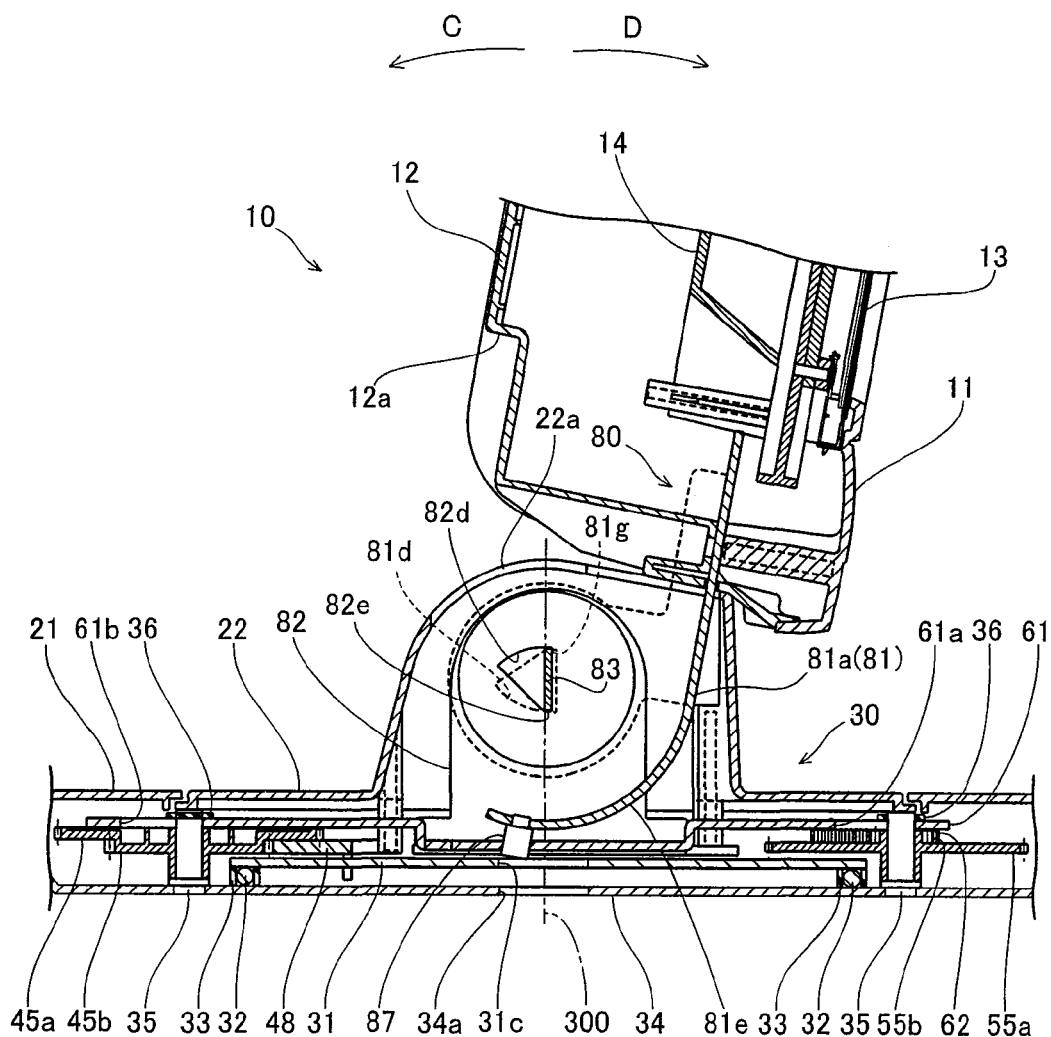

The support shafts 83 come into contact with second edges of the sectorial holes 81d of the display screen support member 81 as shown in FIG. 20 in a state where the display body 10 (see FIG. 19) is continuously turned along arrow D (see FIG. 19) by the user, so that the display screen support member 81 reaches the prescribed turning angle (10° in the first embodiment) and rotation along arrow D is regulated. At this time, the rack plate 60 slides along arrow Q and second ends of the inner side surfaces of the long holes 61a and 61b of the plate member 61 come into contact with the side surfaces of the boss members respectively, whereby the rack plate 60 is inhibited from sliding along arrow Q, as shown in FIG. 18. Therefore, the display body 10 stops turning along arrow P at a position shown in FIG. 20 and stands still at this position. At this time, the stepping motor 52 (see FIG. 18) continuously drives and hence driving torque transmitted from the stepping motor 52 (see FIG. 18) is transmitted to the drive gear 72 (see FIG. 18) of the torque limiter 70 (see FIG. 18) through the worm gear 57 (see FIG. 18) and the gear 53 (see FIG. 18).

As shown in FIG. 6, the drive gear 72 is pressed against the driven gear 71 with the urging force previously set by the spring member 73, and therefore the inner peripheral surface of the drive gear 72 and the outer peripheral surface of the driven gear 71 slip so that the driving torque of the drive gear 72 is not transmitted to the driven gear 71, when driving torque, which is not less than the frictional force between the inner peripheral surface of the drive gear 72 and the outer peripheral surface of the driven gear 71 following the pressure contact force of the spring member 73, occurs with respect to the drive gear 72, similarly to the case where the display body 10 (see FIG. 16) stops turning upward (along arrow C in FIG. 16). In other words, the driven gear 71, the gears 54 and 55 stop rotation regardless of the rotation of the drive gear 72, when the rack plate 60 stops moving (sliding) along arrow Q as shown in FIG. 18.

The turning operation of the display screen turning apparatus 20 in the horizontal direction in the horizontal plane will be now described.

As shown in FIGS. 3 and 4, the user presses a horizontal turn button (not shown) of the attached remote control (not shown) in the state where the display screen support member 81 is perpendicular to the turning plate 31 on the base portion 30 and directed frontward, whereby a signal turning the display body 10 (see FIG. 1) rightward (along arrow A in FIG. 1) is transmitted to the control circuit portion (not shown) of the display body 10, and the stepping motor 42 of the display screen turning apparatus 20 (see FIG. 3) is driven. More specifically, the worm gear 47 mounted on the stepping motor 42 rotates along arrow E6 (see FIG. 7) following the drive of the stepping motor 42, and the drive gear 77 of the torque limiter 75 rotates along arrow E8 through the gear 43, as shown in FIG. 3. The driven gear 76 of the torque limiter 75 rotates along arrow E8 and the turning gear member 48 rotates along arrow E11 through the gears 44 and 45. Thus, the turning plate 31 on the base portion 30 mounted with the display screen support member 81 starts turning along arrow G1 as shown in FIG. 3 and hence the display body 10 (see FIG. 1) starts turning rightward (along arrow A in FIG. 1).

Figure 21:
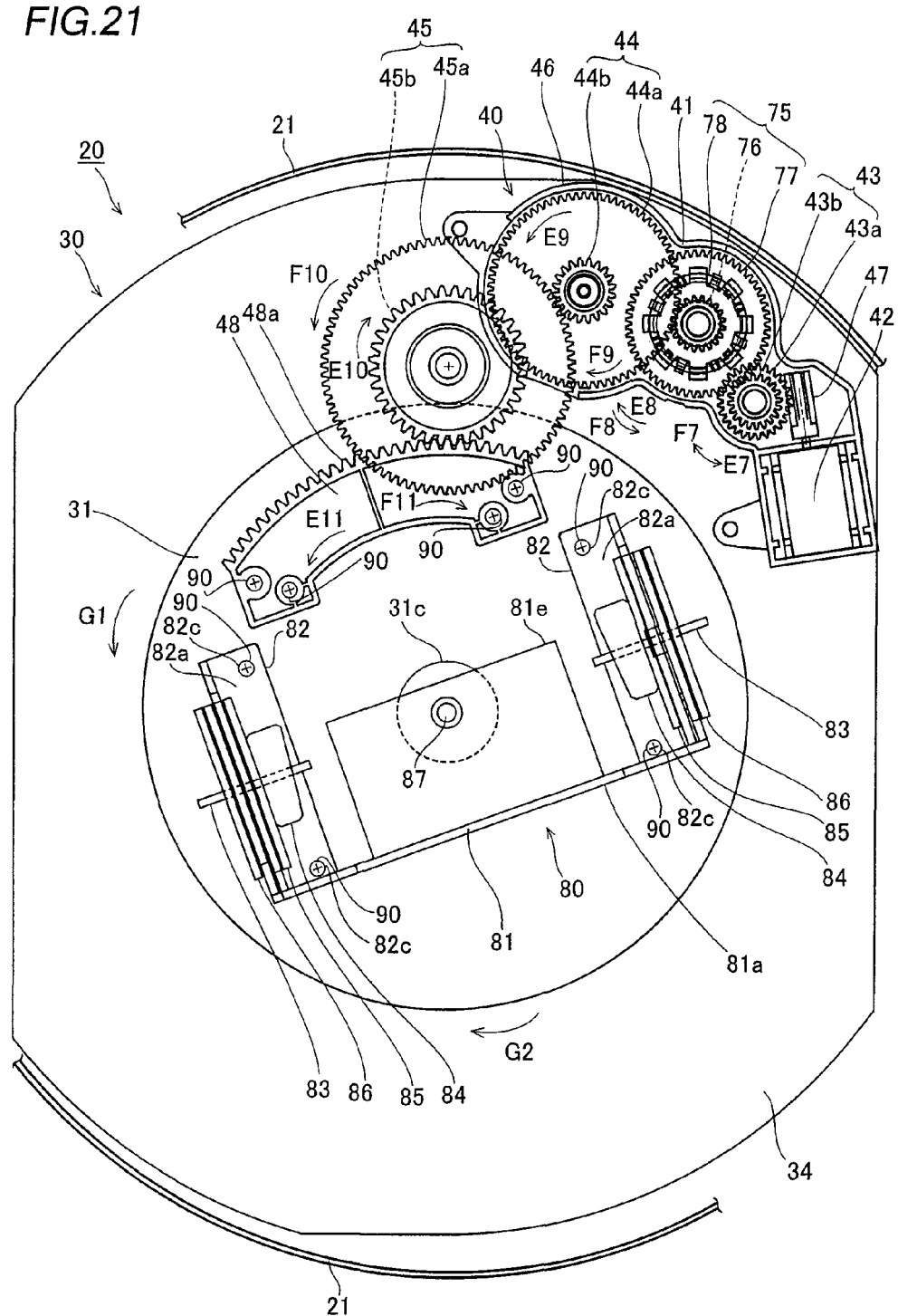
FIGS. 21 and 22 are diagrams for illustrating a turning operation of the display screen turning apparatus according to the first embodiment of the present invention shown in FIG. 1 in a horizontal direction.

As shown in FIG. 21, the turning plate 31 on the base portion 30 placed with the display body 10 (see FIG. 1) continuously turns rightward (along arrow A in FIG. 1) at a prescribed rotational speed. Referring to FIG. 21, the vertical turn driving portion 50 (see FIG. 3) is not shown in the drawing in order to describe the turning operation of the turning plate 31 in the horizontal direction.

Figure 23:
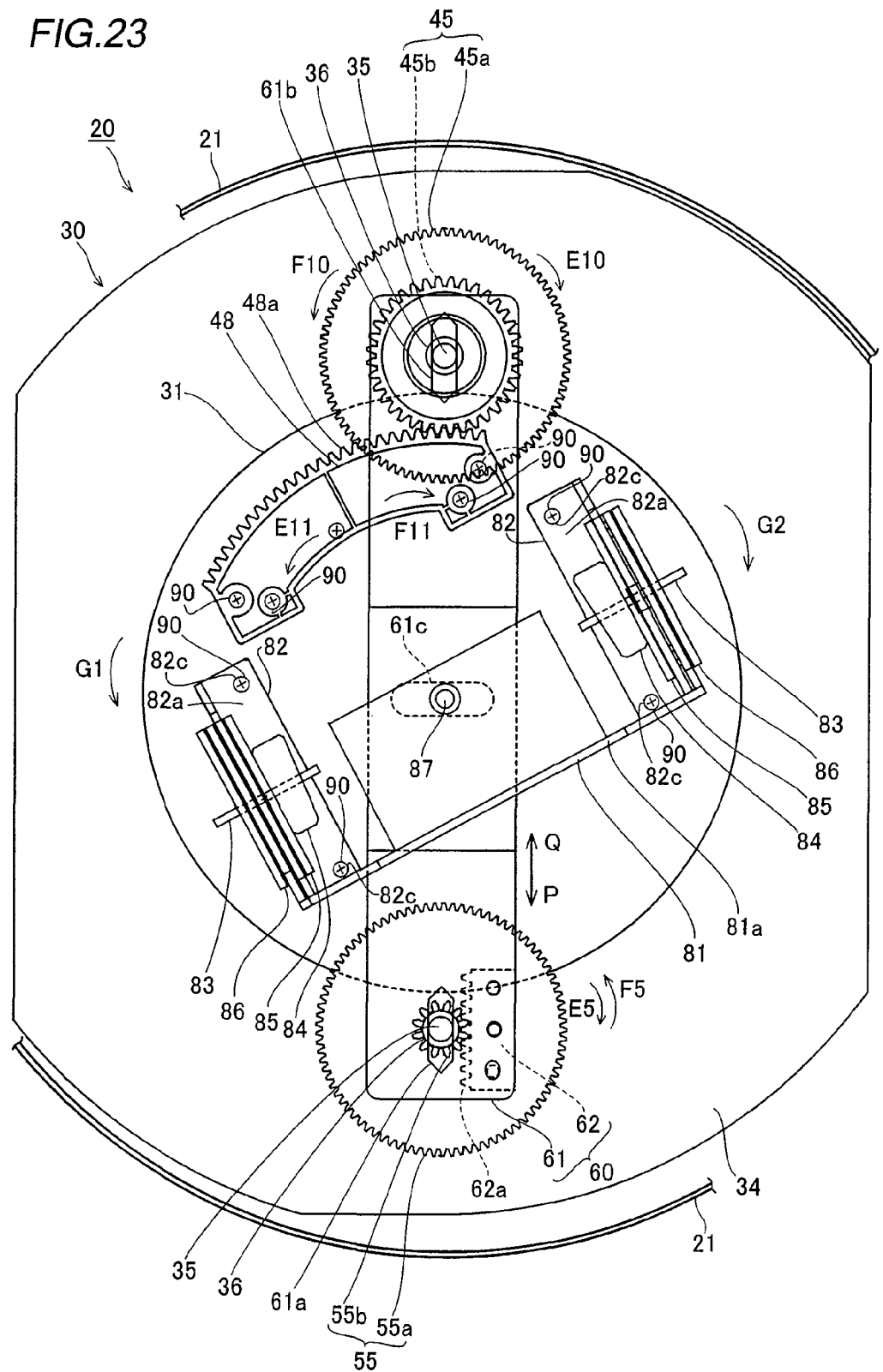
FIGS. 23 to 25 are diagrams for illustrating turning operations of the display screen turning apparatus according to the first embodiment of the present invention shown in FIG. 1 in the anteroposterior (vertical) direction and the horizontal direction.

According to the first embodiment, the engaging member 87 of the display screen support member 81 is located on the rotation center in the horizontal direction (along arrows G1 and G2) of the turning plate 31 and the display screen support member 81 as shown in FIG. 10, and hence the engaging member 87 does not move on the rotation center regardless of turning operation of the turning plate 31. Therefore, the rack plate 60 engaged with the engaging member 87 also does not linearly move (slide) along arrows P and Q as shown in FIG. 23.

When the display body 10 is turned by an angle desired by the user, the user releases the press of the horizontal turn button (not shown) of the attached remote control (not shown) so that the signal turning the display body 10 (see FIG. 1) rightward (along arrow A in FIG. 1) is not transmitted to the control circuit portion (not shown) of the display body 10, and hence the drive of the stepping motor 42 is stopped. Thus, the base portion 30 stops turning along arrow G1 at a position shown in FIG. 21 and stands still.

Figure 22:
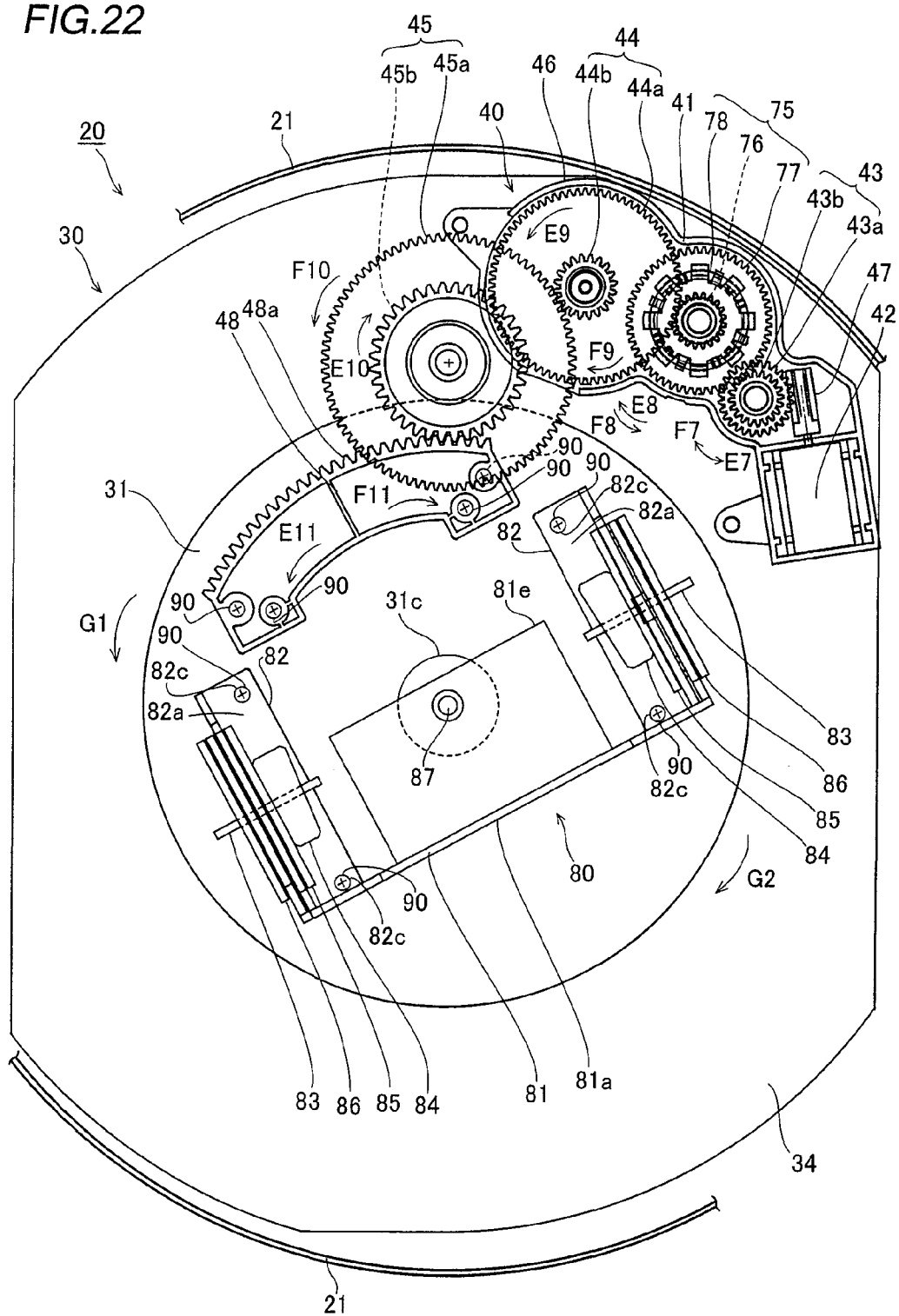

In a state where the user continuously turns the display body 10 (see FIG. 1) rightward (along arrow A in FIG. 1), when the turning angle of the base portion 30 is maximum (30° in the first embodiment), the turning plate 31 comes into contact with a stopper member (not shown) provided inside the base portion 30 to regulate the turning operation along arrow A (see FIG. 1). Therefore, the base portion 30 stops turning along arrow G1 at a position as shown in FIG. 22 and stands still. At this time, the stepping motor 42 (see FIG. 22) continuously drives and hence driving torque transmitted from the stepping motor 42 (see FIG. 22) is transmitted to the drive gear 77 (see FIG. 22) of the torque limiter 75 (see FIG. 22) through the worm gear 47 (see FIG. 22) and the gear 43 (see FIG. 22).

As shown in FIG. 7, the drive gear 77 is pressed against the driven gear 76 with the urging force previously set by the spring member 78, and therefore the inner peripheral surface of the drive gear 77 and the outer peripheral surface of the driven gear 76 slip so that the driving torque of the drive gear 77 is not transmitted to the driven gear 76, when driving torque, which is not less than the frictional force between the inner peripheral surface of the drive gear 77 and the outer peripheral surface of the driven gear 76 following the pressure contact force of the spring member 78, occurs with respect to the drive gear 77. In other words, when the turning plate 31 comes into contact with the stopper members (not shown), the driven gear 76, the gears 44 and 45 and the turning gear member 48 stop rotation regardless of the rotation of the drive gear 77. Referring to FIG. 22, the vertical turn driving portion 50 (see FIG. 3) is not shown in the drawing in order to describe the turning operation of the turning plate 31 in the horizontal direction similarly to FIG. 21.

While the base portion 30 is turned along arrow G1 shown in FIGS. 21 and 22 in the description of the aforementioned turning operation, the horizontal turn driving portion 40 turns similar to the aforementioned rotational operation also at the time of the turning operation of the turning plate 31 along arrow G2 opposite to arrow G1 and hence the display body 10 (see FIG. 1) is turned leftward (along arrow B in FIG. 1) by rotation of the turning plate 31 along arrow G2.

A turning operation of the turning the display body 10 (see FIG. 1) in the vertical direction (along arrows C and D in FIG. 1) in a state where the display body 10 vertically placed on the base portion 30 turns in the horizontal direction (along arrows A and B in FIG. 1) by a prescribed angle as shown in FIG. 4 will be now described.

Figure 24:
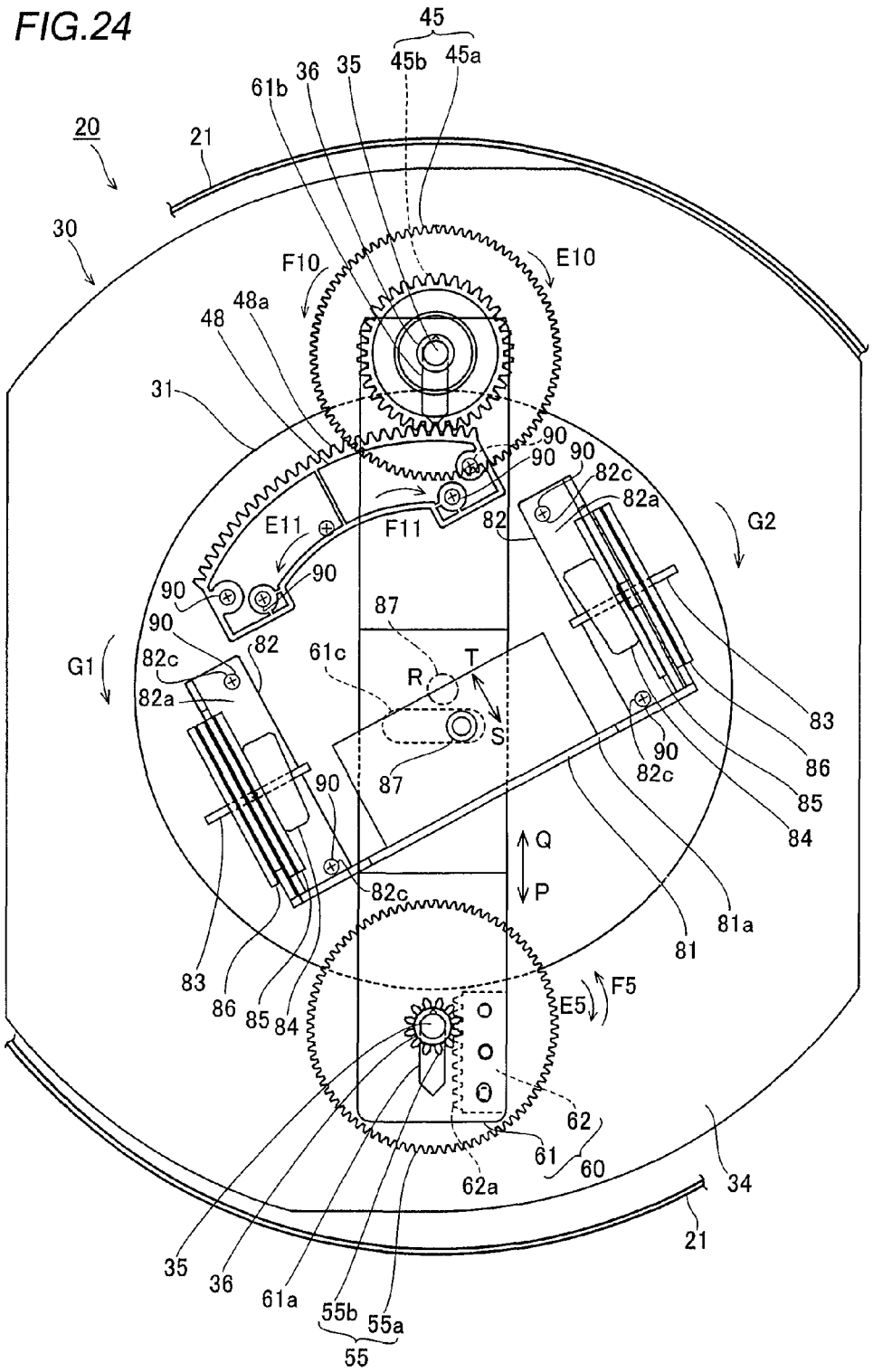

As shown in FIG. 23, the user presses the upward tilt button (not shown) of the attached remote control (not shown) in a state of turning the turning plate 31 on the base portion 30 rightward (along arrow G1) by the prescribed angle and stopping the turning operation at this position, so that the vertical turn driving portion 50 (see FIG. 3) starts driving similarly to the above. In other words, the rack plate 60 starts moving (sliding) along arrow P from a position shown in FIG. 23 to a position shown in FIG. 24. Referring to FIGS. 23 and 24, the horizontal turn driving portion 40 (see FIG. 3) and the vertical turn driving portion 50 (see FIG. 3) are not shown except of a part thereof in the drawing in order to describe an operation of the engaging member 87 of the rack plate 60 and the display screen support mechanism 80.

According to the first embodiment, the engaging member 87 also gradually moves (rotates) along arrows S from a position R (position of the engaging member 87 when the display body 10 is vertically placed is shown as an outer shape shown by a two-dot chain line (imaginary line) following the movement of the rack plate 60 along arrow P, as shown in FIG. 24. Therefore, the engaging member 87 engaged with the engaging hole 61c of the rack plate 60 rotates along arrow C as shown in FIG. 16, and hence the display body 10 mounted on the display screen support member 81 starts turning upward (along arrow C).

At this time, similarly to the above, the base portions 81g of the sectorial holes 81d of the display screen support member 81 come into contact with the upper surfaces of the support shafts 83, so that the display screen support member 81 and the support shafts 83 integrally rotates along arrow C about the base portions 82e of the sectorial holes 82d of the vertical support members 82, as shown in FIG. 11. The display screen support member 81 mounted with the display body 10 continuously turns along arrow C at the prescribed turning speed following the drive of the stepping motor 52 (see FIG. 3) as shown in FIG. 16.

When the display body 10 is turned along arrow C in FIG. 4 by an angle desired by the user, the user releases the press of the upward tilt button (not shown) of the attached remote control (not shown) so that the signal turning the display body 10 (see FIG. 1) upward (along arrow C in FIG. 4) is not transmitted to the control circuit portion (not shown) of the display body 10. Therefore, the drive of the stepping motor 52 is stopped. Thus, the display screen support member 81 stops turning along arrow C at the position shown in FIG. 16 and stands still.

As shown in FIG. 24, the rack plate 60 is slid along arrow P and first ends of inner side surfaces of the long holes 61a and 61b of the plate member 61 come into contact with the boss members respectively in a state where the display body 10 (see FIG. 16) is continuously turned upward (along arrow C in FIG. 16) by the user, whereby the rack plate 60 is inhibited from sliding along arrow P. At this time, the display screen support member 81 reaches the prescribed turning angle (10° in the first embodiment) as shown in FIG. 17. Therefore, the display body 10 stops turning along arrow C at a position as shown in FIG. 20 and stands still. At this time, the stepping motor 52 (see FIG. 15) continuously drives and hence driving torque transmitted from the stepping motor 52 (see FIG. 15) is transmitted to the drive gear 72 (see FIG. 15) of the torque limiter 70 (see FIG. 15) through the worm gear 57 (see FIG. 15) and the gear 53 (see FIG. 15), but not transmitted to the driven gear 71 (see FIG. 15) with the torque limiter 70 (see FIG. 15). In other words, the driven gear 71, and the gears 54 and 55 stop rotation regardless of the rotation of the drive gear 72, when the rack plate 60 stops moving (sliding) along arrow Q as shown in FIG. 15.

Figure 25:
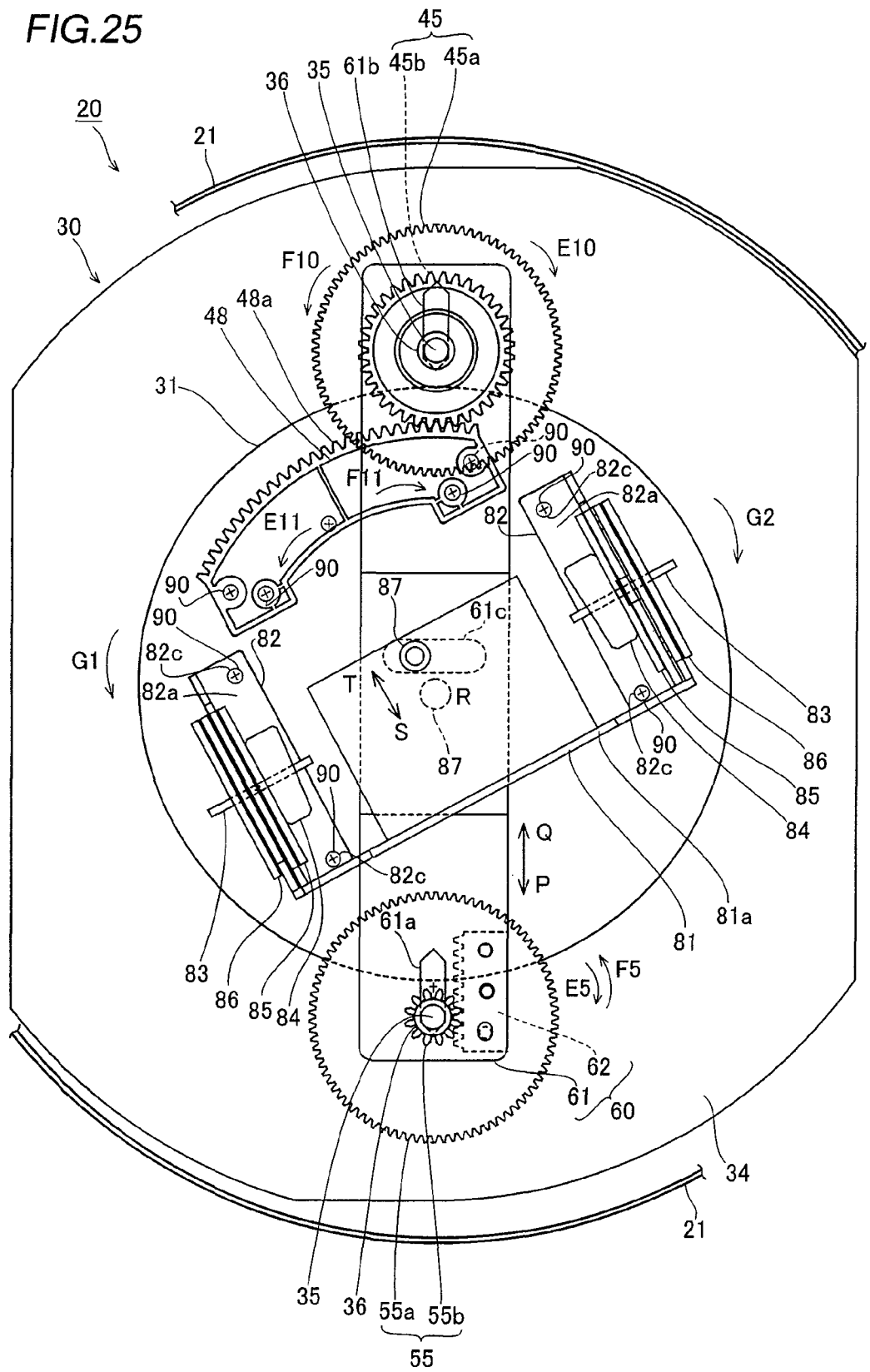

As shown in FIG. 22, the user presses the downward tilt button (not shown) of the attached remote control (not shown) in a state of turning the turning plate 31 on the base portion 30 rightward (along arrow G1) by a prescribed angle and stopping the turning operation at this position, whereby the vertical turn driving portion 50 starts driving similarly to the above. In other words, the rack plate 60 starts sliding along arrow Q as shown in FIG. 25. Referring to FIG. 25, the horizontal turn driving portion 40 (see FIG. 3) and the vertical turn driving portion 50 (see FIG. 3) are not shown except of a part thereof in the drawing in order to describe an operation of the engaging member 87 of the rack plate 60 and the display screen support mechanism 80, similarly to FIG. 24.

According to the first embodiment, the engaging member 87 also gradually moves (rotates) along arrow T from the position R (position of the engaging member 87 when the display body 10 is vertically placed is shown as an outer shape shown by a two-dot chain line (imaginary line) following the movement of the rack plate 60 along arrow Q, as shown in FIG. 25. Therefore, the engaging member 87 engaged with the engaging hole 61c of the rack plate 60 rotates along arrow D as shown in FIG. 19, and hence the display body 10 mounted on the display screen support member 81 starts turning upward (along arrow D).

At this time, the base portions 81g of the sectorial holes 81d of the display screen support member 81 come into contact with the upper surfaces of the support shafts 83, so that the display screen support member 81 and the support shafts 83 integrally start rotating along arrow D about the base portions 82e of the sectorial holes 82d of the vertical support members 82, as shown in FIG. 11. When the display screen support member 81 and the support shafts 83 rotate by about 5° (angle β2 in FIG. 11), the support shafts 83 come into contact with second edges of the sectorial holes 82d of the vertical support members 82, as shown in FIG. 19. When the display screen support member 81 is further rotated along arrow D in this state, the display screen support member 81 continuously rotates about the base portions 81e of the sectorial holes 81d along arrow D with respect to the support shafts 83, as shown in FIG. 19.

When the display body 10 is turned along arrow D in FIG. 4 by an angle desired by the user, the user releases the press of the downward tilt button (not shown) of the attached remote control (not shown) so that the signal turning the display body 10 (see FIG. 4) downward (along arrow D in FIG. 4) is not transmitted to the control circuit portion (not shown) of the display body 10, and hence the drive of the stepping motor 52 is stopped. Thus, the display screen support member 81 stops turning along arrow D at a position as shown in FIG. 19 and stands still.

The support shafts 83 come into contact with the second edges of the sectorial holes 81d of the display screen support member 81 as shown in FIG. 20 in a state of continuously turning, so that the display screen support member 81 reaches the prescribed turning angle (10° in the first embodiment) and rotation along arrow D is regulated. At this time, the rack plate 60 slides along arrow Q and second ends of the inner side surfaces of the long holes 61a and 61b of the plate member 61 come into contact with the boss members respectively, whereby the rack plate 60 is inhibited from sliding along arrow Q, as shown in FIG. 18. Therefore, the display body 10 stops turning along arrow D at a position as shown in FIG. 20 and stands still. At this time, the stepping motor 52 (see FIG. 18) continuously drives and hence driving torque transmitted from the stepping motor 52 (see FIG. 18) is transmitted to the drive gear 72 (see FIG. 18) of the torque limiter 70 (see FIG. 18) through the worm gear 57 (see FIG. 18) and the gear 53 (see FIG. 18), but not transmitted to the driven gear 71 (see FIG. 18) with the torque limiter 70 (see FIG. 18). In other words, the driven gear 71, and the gears 54 and 55 stop rotation regardless of the rotation of the drive gear 72, when the rack plate 60 stops moving (sliding) along arrow Q as shown in FIG. 18.

While the display screen support member 81 vertically turns in the state of turning the turning plate 31 along arrow G1 shown in FIGS. 24 and 25 by the prescribed angle in the aforementioned description of the vertical turning operation of the display screen support member 81, the display screen support member 81 turns with the vertical turn driving portion 50 similarly to the aforementioned turning operation also in the state of turning the turning plate 31 along arrow G2 opposite to the arrow G1 by the prescribed angle so that the display body 10 (see FIG. 1) turns along arrow D (see FIG. 1).

While the display body 10 vertically placed on the base portion 30 first turns in the horizontal direction (along arrows A and B in FIG. 1) by the prescribed angle and then the display body 10 (see FIG. 1) turns in the vertical direction (along arrows C and D in FIG. 1) in the description of the aforementioned turning operation, contrary to this, the display body 10 can be turned to a position desired by the user by performing operations similar to the aforementioned operations of the horizontal turn driving portion 40 (see FIG. 3) and the vertical turn driving portion 50 (see FIG. 3) also in a case where the display body 10 (see FIG. 1) first turns in the vertical direction (along arrows C and D in FIG. 1) and then turns in the horizontal direction (along arrows A and B in FIG. 1) by the prescribed angle.

According to the first embodiment, as hereinabove described, the display screen turning apparatus 20 comprises the stepping motor 52 arranged inside the base portion 30 and the transmission gear portion 51 for transmitting the driving force of the stepping motor 52, arranged inside the base portion 30, whereby both the transmission gear portion 51 and the stepping motor 52 serving as the driving source of the transmission gear portion 51 can be housed inside the base portion 30 and hence the transmission gear portion 51 large in size can be easily arranged, dissimilarly to a case where both the transmission gear portion 51 difficult to be downsized and the stepping motor 52 serving as the driving source of the transmission gear portion 51 are arranged outside the base portion 30.

According to the first embodiment, the display screen turning apparatus 20 comprises the display screen support member 81 provided with the engaging member 87 and supporting the display body 10 rotatably in the horizontal plane and rotatably with respect to the vertical plane, the rack plate 60 arranged on the base portion 30 and including the engaging hole 61c engaged with the engaging member 87 of the display screen support member 81 and the rack gear 62 meshed with the gear 55 of the transmission gear portion 51 in the horizontal direction, and the engaging member 87 of the display screen support member 81 engaged with the engaging hole 61c of the rack plate 60 rotates along arrows C and D (see FIG. 4) following reciprocation of the rack plate 60 along arrows P and Q (see FIG. 3) in the horizontal plane by the normal and reverse rotation (rotation along arrows E1 and F1 in FIG. 6) of the stepping motor 52 so that the display screen support member 81 rotates vertical direction (along arrows C and D in FIG. 1) by the prescribed angle with respect to the vertical plane, whereby the own weight of the display body 10 is applied to the turning plate 31 through the display screen support member 81 regardless of the time of the stop of the display body 10 and the time of the turning operation of the display body 10, while not applied to the transmission gear portion 51 including the gear portion 55 meshed through the rack plate 60 and the rack gear 62 in the horizontal direction, and hence the driving force of the stepping motor 52 can be smoothly transmitted with the transmission gear portion 51.

According to the first embodiment, the display screen turning apparatus 20 comprises the pair of boss members 35 provided on the base portion 30 and reciprocably supporting the rack plate 60 in the horizontal plane, and the rack plate 60 is reciprocable on a line connecting the pair of boss members 35 by movably supporting the rack plate 60 with respect to the pair of boss members 35, whereby the rack plate 60 is linearly reciprocated through the rack gear 62 in the state of being supported by the pair of boss members 35 and hence the display screen support member 81 engaged with the rack plate 60 can be stably rotated.

According to the first embodiment, the rack plate 60 includes the pair of slot-shaped long holes 61a and 61b extending substantially parallel to the direction in which the rack plate 60 reciprocates in the horizontal plane and the pair of long holes 61a and 61b receive the pair of boss members 35 on the base portion 30 so that the rack plate 60 is movably supported with respect to the pair of boss members 35, whereby the rack plate 60 can be reciprocated limiting in the range of the longitudinal length of the long holes 61a and 61b receiving the pair of boss members 35 on the base portion 30 and hence the display screen support member 81 can be easily rotated in the anteroposterior direction by the prescribed angle.

According to the first embodiment, the transmission gear portion 51 includes the torque limiter 70 interrupting the driving force of the stepping motor 52 when the driving force of the stepping motor 52 exceeds a prescribed value, whereby the driving force of the stepping motor 52 continuously rotating can be interrupted with the torque limiter 70 when the vertical turn of the display body 10 is blocked by abrupt external force or the like, or when the turning angle of the display body 10 reaches maximum value to stop the turning operation, and hence the driving force of the stepping motor 52 is not transmitted to the transmission gear portion 51. Therefore, the transmission gear portion 51 can be inhibited from being broken due to excessive rotation when the driving force of the stepping motor 52 exceeds the prescribed torque.

According to the first embodiment, the stepping motor 52 is constituted such that the driving force of the stepping motor 52 is transmitted to the transmission gear portion 51 through the worm gear 57 press-fitted into the driving axis of the stepping motor 52, whereby the worm gear 57 can not be rotated with rotation of the gears 55 and 54, the torque limiter 70 and the gear 53 also when the transmission gear portion 51 is sequentially driven in the order of the gears 55 and 54, the torque limiter 70 and the gear 53 following the turn of the display body 10 due to abrupt external force and hence the stepping motor 52 can be inhibited from reversely driving with driving force other than the driving force of the stepping motor 52.

According to the first embodiment, the engaging member 87 is provided on the vertical segment 300 (shown by a one-dot chain line in FIG. 4) passing through the rotation center in the rotational direction (along arrows G1 and G2 in FIG. 3) in the horizontal plane of the display screen support member 81, whereby the engaging member 87 is located on the rotation center in the horizontal plane of the display screen support member 81 also when the display body 10 turns in the horizontal direction (along arrows A and B in FIG. 1) in the horizontal plane and hence the rack plate 60 does not move in the direction intersecting with the moving direction in the horizontal plane (along arrows P and Q in FIG. 3) and the engaging member 87 and the engaging hole 61c of the rack plate 60 are continuously engaged with each other. Therefore, the display screen support member 81 and the display body 10 can be turned in the horizontal direction (along arrows C and D in FIG. 4) with respect to the vertical plane, also when the rack plate 60 is reciprocated along arrows P and Q in FIG. 3 from a state where the display body 10 is turned in the horizontal direction (along arrows A and B in FIG. 1) in the horizontal plane.

According to the first embodiment, the rack plate 60 includes the engaging hole 61c rotatably engaged with the engaging member of the display screen support member 81, whereby reciprocation of the rack plate 60 can be easily transmitted to the display screen support member 81 through the engaging hole 61c.

According to the first embodiment, the engaging hole 61c of the rack plate 60 is formed in a slot-shape extending in the direction perpendicular to the direction in which the rack plate 60 reciprocates in horizontal plane (along arrows P and Q in FIG. 3), whereby the engaging member 87 of the display screen support member 81 is continuously engaged with the engaging hole 61c of the rack plate 60 while moving inside the engaging hole 61c of rack plate 60 in a lateral direction as shown in FIGS. 24 and 25 also when the display body 10 is turned in the anteroposterior direction (along arrows C and D in FIG. 1) with respect to the vertical plane in the state of being turned in the horizontal direction (along arrows A and B in FIG. 1) in the horizontal plane, and hence the display screen support member 81 can be easily turned in the anteroposterior direction (along arrows C and D in FIG. 4) with respect to the vertical plane.

Second Embodiment

A structure of a rack plate 100 of a vertical turn driving portion 50 according to a second embodiment, having a structure different from the first embodiment will be now described with reference to FIGS. 26 to 29. A structure of the second embodiment is similar to that of the first embodiment except the rack plate 100 of the vertical turn driving portion 50, and hence the structure thereof will not be described.

Figure 26:
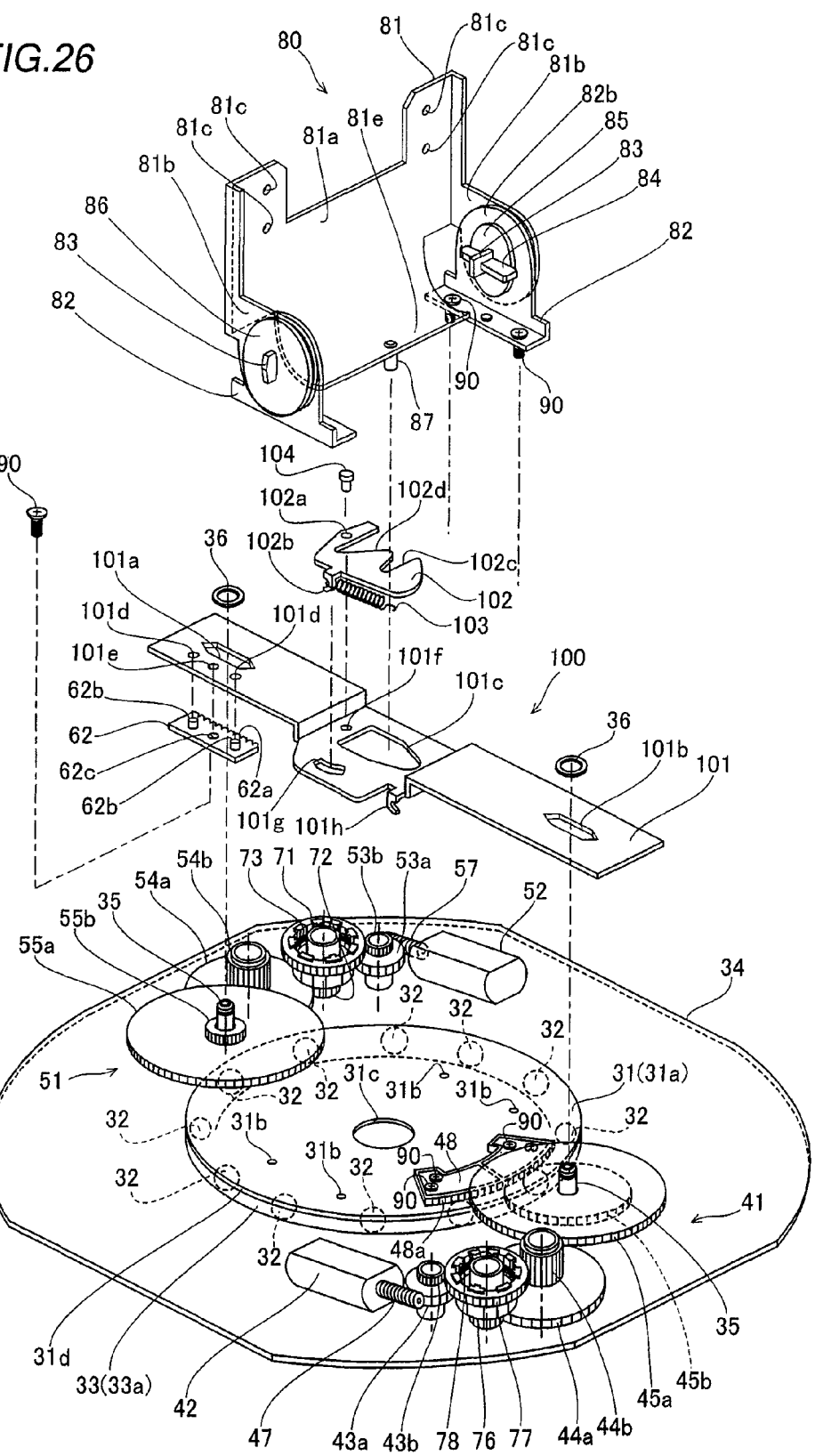
FIG. 26 is an exploded perspective view for illustrating a structure of a display screen turning apparatus according to a second embodiment of the present invention in detail.
Figure 28:
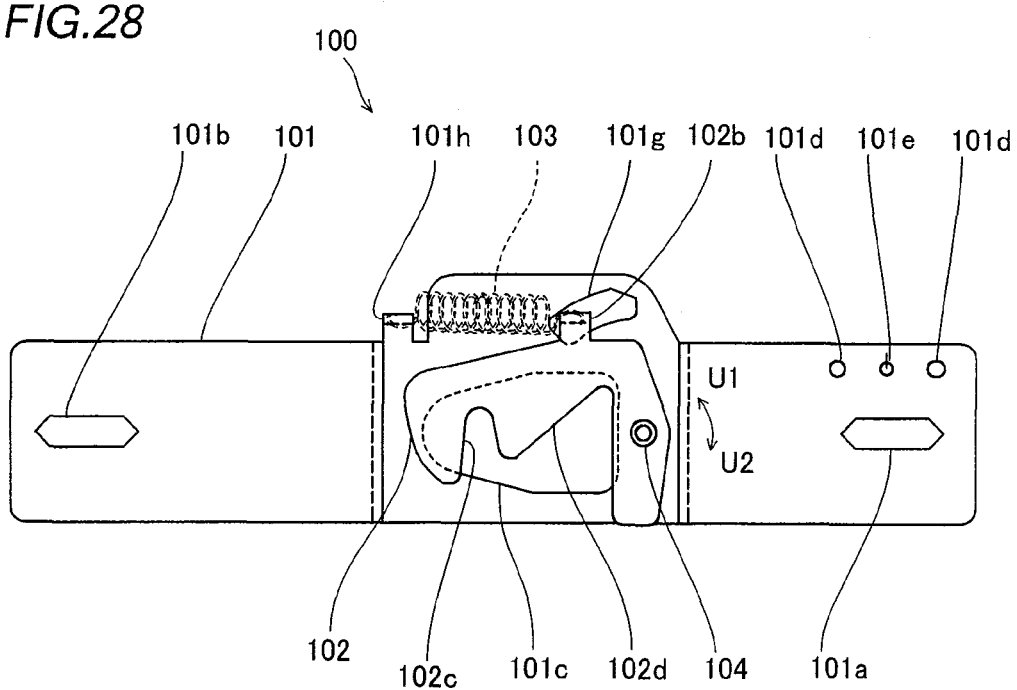
FIG. 28 is a diagram for illustrating a structure of the rack plate of the vertical turn driving portion according to the second embodiment of the present invention.

According to the second embodiment, the rack plate 100 of the vertical turn driving portion 50 is constituted by a plate member 101 made of sheet metal, the rack gear 62 made of resin, a locking lever 102 made of sheet metal, a spring member 103 and a pin member 104, as shown in FIG. 26. The spring member 103 is an example of the "urging member" in the present invention. In the rack plate 100, the pin member 104 is inserted into a hole 102a of the locking lever 102 and a hole 101f of the plate member 101 in this order from an upper portion of the plate member 101 so that the locking lever 102 is rotatably mounted on the plate member 101 in a horizontal direction, as shown in FIGS. 26 and 28. As shown in FIG. 28, the spring member 103 is engaged with a hook 102b of the locking lever 102 and a hook 101h of the plate member 101. Therefore, the locking lever 102 is so urged as to stand still at a position shown in FIG. 28 (position where an engaging portion 102c of the locking lever 102 engages with the engaging member 87 of the display screen support member 81) with the pulling force of the spring member 103 in a normal state. At this time, the hook 102b of the locking lever 102 is so formed as to be movable (rotatable) inside the hole 101g of the plate member 101, as shown in FIG. 28.

Figure 29:
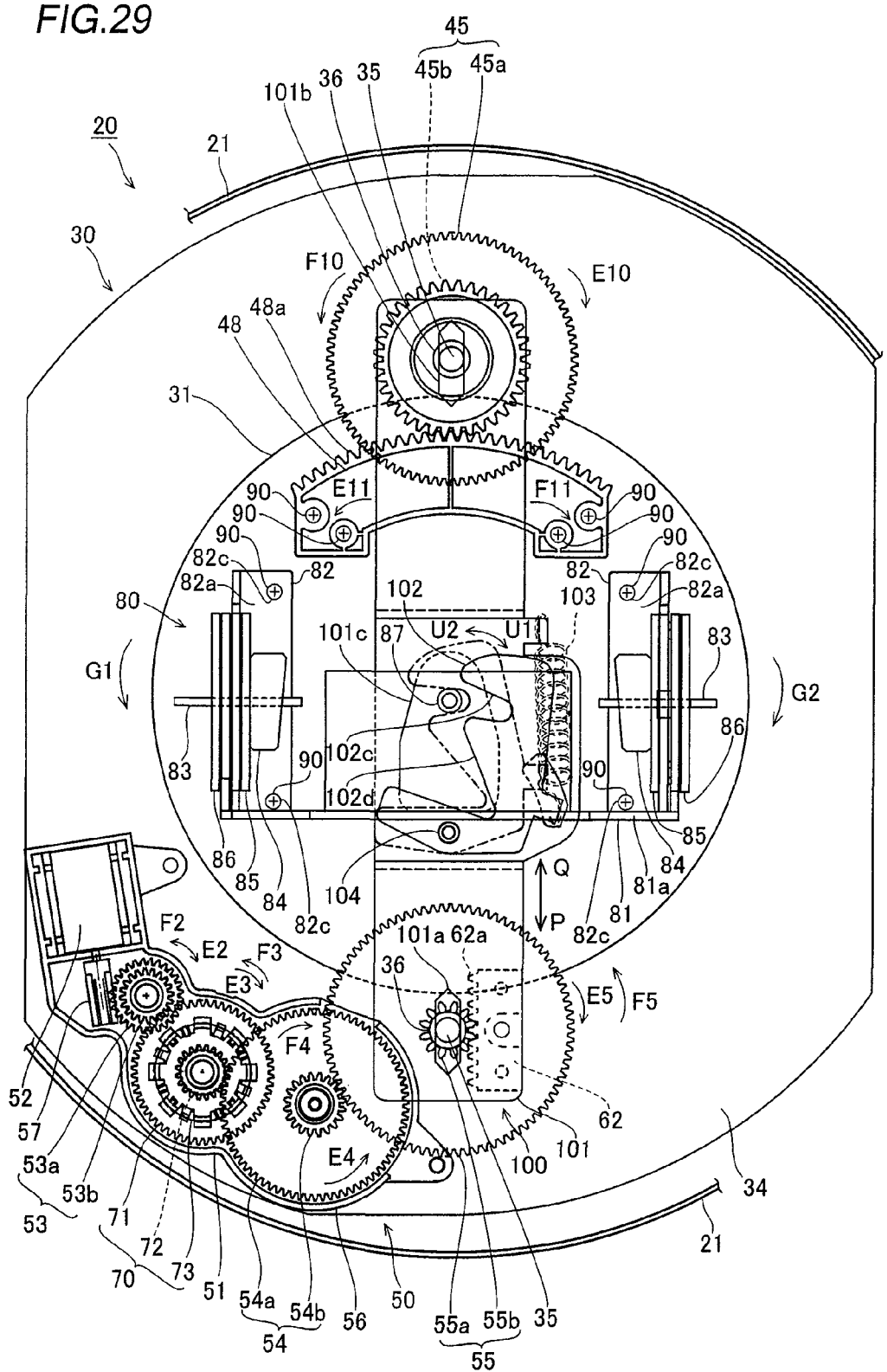
FIG. 29 is a diagram for illustrating an operation of the locking lever of the rack plate according to the second embodiment of the present invention.

According to the second embodiment, the plate member 101 of the rack plate 100 is provided with a hole 101c as shown in FIGS. 26 and 28. This hole 101c is formed in a shape larger than a rotating region of the engaging member 87 at the time of an engaging state between the engaging member 87 of the display screen support member 81 and the engaging portion 102c of the locking lever 102 and at the time of release of the engaging state between the engaging member 87 of the display screen support member 81 and the engaging portion 102c of the locking lever 102 as shown in FIG. 29. The hole 101c is an example of the "hole" in the present invention.

Figure 27:
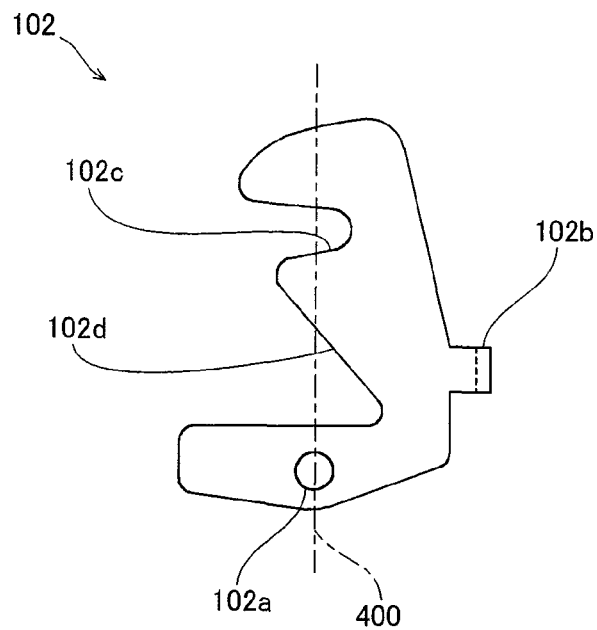
FIG. 27 is a diagram showing a locking lever of a rack plate of a vertical turn driving portion according to the second embodiment of the present invention.

According to the second embodiment, the locking lever 102 integrally has the engaging portion 102c engageable with the engaging member 87 (see FIG. 26) of the display screen support mechanism 80 (see FIG. 26) as shown in FIGS. 26 and 27. Therefore, similarly to the first embodiment, the locking lever 102 is also integrally reciprocated with the rack plate 100 following reciprocation (slide) of the rack plate 100 along arrows P and Q so that the display screen support member 81 (see FIG. 26) of the display screen support mechanism 80 (see FIG. 26) can rotate in the vertical direction (along arrows C and D) along with the engaging member 87 (see FIG. 26), as shown in FIG. 29. The engaging portion 102c is an example of the "second engaging portion" in the present invention.

According to the second embodiment, the locking lever 102 has a guide portion 102d so provided as to obliquely cross a segment 400 (shown by a one-dot chain line) connecting the hole 102a and the engaging portion 102c as shown in FIG. 27. This guide portion 102d is provided for allowing rotation of the locking lever 102 about the pin member 104 in the horizontal direction (along arrows U1 and U2 in FIG. 29) in the horizontal plane and easy guide of the engaging member 87 (see FIG. 26) to the engaging portion 102c by bringing a side surface of the engaging member 87 (see FIG. 26) into contact with the guide portion 102d following or the engaging member 87 (see FIG. 26 rotation from obliquely upward and gradually lowering of the same when recovering the engaging state between the engaging member 87 (see FIG. 26) and the engaging portion 102c.

A turning operation of the display screen turning apparatus 20 according to the second embodiment in the vertical direction will be now described with reference to FIGS. 11, 21, 22, 26 and 29 to 33. A turning operation of the display screen turning apparatus in the horizontal direction is similar to that of the first embodiment and hence will not be described.

Figure 30:
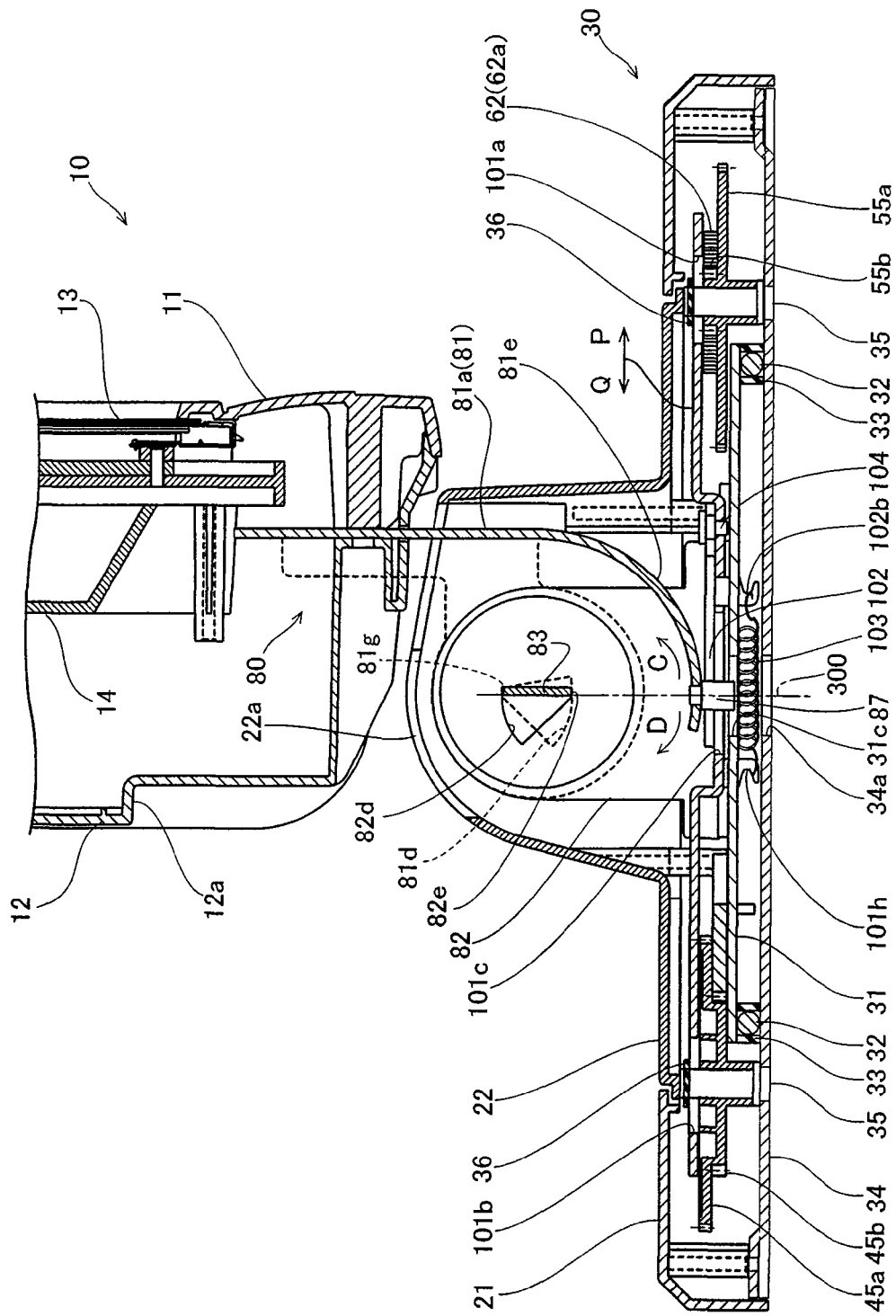
FIGS. 30 to 32 are diagrams for illustrating a turning operation of the display screen turning apparatus according to the second embodiment of the present invention in the anteroposterior (vertical) direction.

As shown in FIG. 30, a user inserts his finger through a hole 34a provided on the center of the base member 34 and a hole 31c of a turning plate 31 from a bottom of a base portion 30 in a state where the display body 10 is vertically placed on the display screen turning apparatus 20 so that the locking lever 102 is moved (rotated) along arrow U1 (see FIG. 29). At this time, the locking lever 102 rotate from a position where an outer shape is shown by a two-dot chain line to a position shown by a solid line as shown in FIG. 29.

According to the second embodiment, the engaging portion 102c of the locking lever 102 disengages from the engaging member 87 (see FIG. 26) of the display screen support mechanism 80 (see FIG. 26) so that the engaging state between the display screen support member 81 and the rack plate 100 are released, as shown in FIG. 29. The engaging member 87 is in a state freely rotatable without interfering with the plate member 101 due to the hole 101c of the plate member 101.

Figure 31:
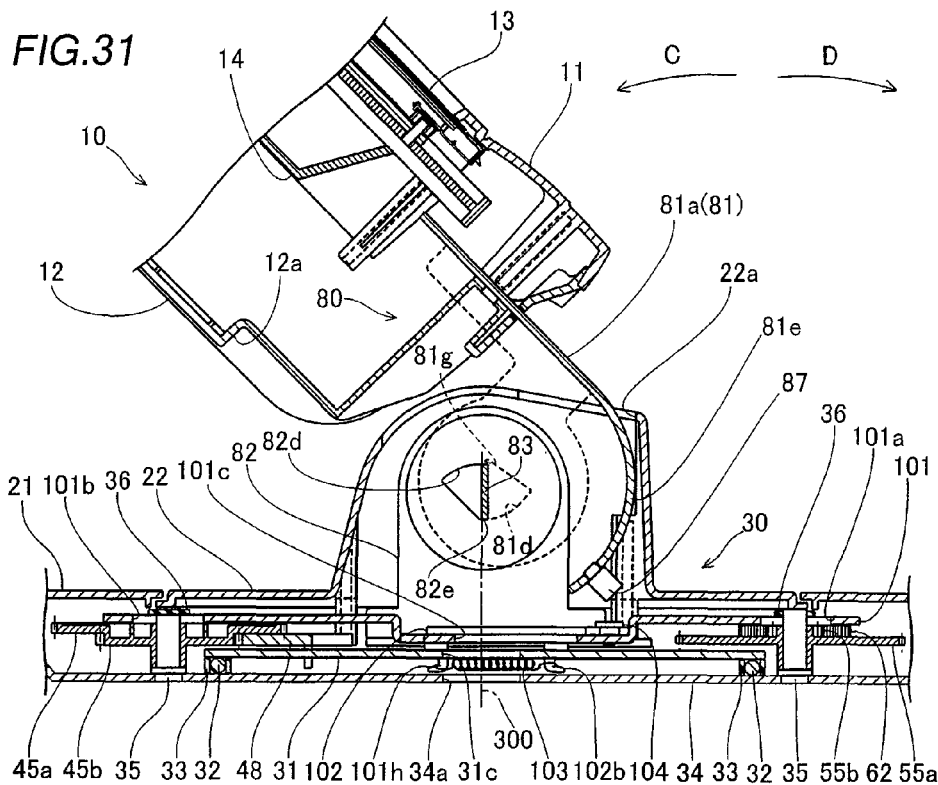
Figure 32:
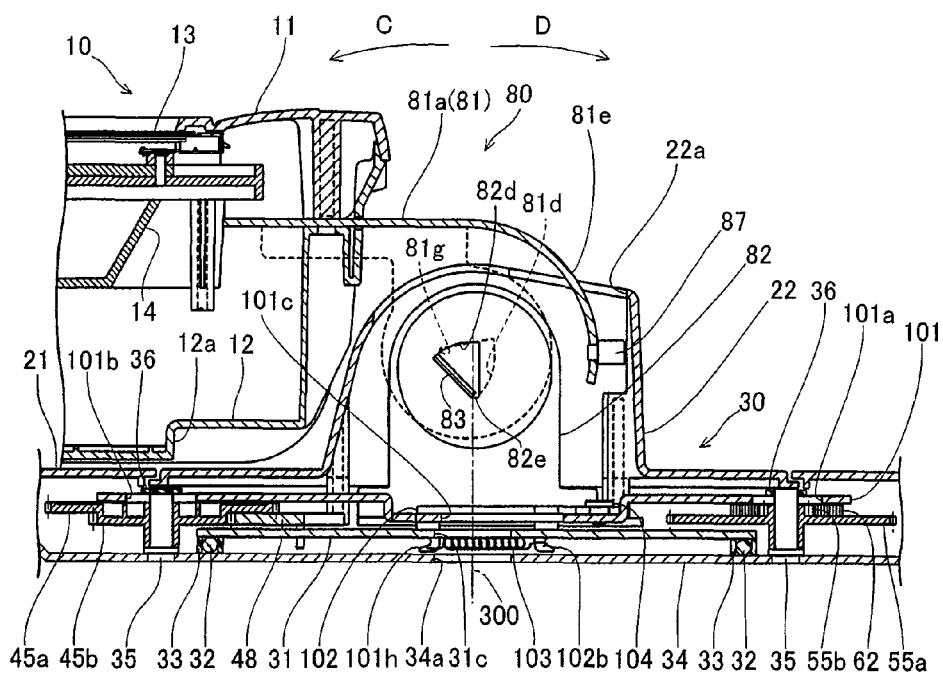

The user presses the display body 10 supported by the display screen support member 81 along arrow C in a state where the display screen support member 81 is supported perpendicular to the display screen turning apparatus 20 shown in FIG. 30. In this case, base portions 81g of the sectorial holes 81d of the display screen support member 81 come into contact with upper surfaces of support shafts 83, so that the display screen support member 81 and the support shafts 83 integrally start rotating along arrow C about the base portions 82e of the sectorial holes 82d of vertical support members 82, as shown in FIG. 11. When the display screen support member 81 and the support shafts 83 rotate by about 45° (angle α2 in FIG. 11), side surfaces of the support shafts 83 come into contact with first edges of the sectorial holes 82d of the vertical support members 82, as shown in FIG. 31. When the user further presses the display body 10 along arrow C in this state, the display screen support member 81 continuously rotates about the base portions 81g of sectorial holes 81d along arrow C with respect to the support shafts 83, as shown in FIG. 31. When the display screen support member 81 further rotates by about 45° (angle α1 shown in FIG. 11) along arrow C, the support shafts 83 come into contact with first edges of the sectoral holes 81d of the display screen support member 81 and stop rotating along arrow C, as shown in FIG. 32. Thus, according to the second embodiment, the display body 10 is rotatable upward (along arrow C) by about 90° as shown in FIG. 32 from the state supported perpendicular to the display screen turning apparatus 20 by the display screen support member 81 as shown in FIG. 30 (at the time of watching and listening). During the aforementioned operation, the locking lever 102 is returned at a position as shown in FIG. 28 with the pulling force of the spring member 103.

As shown in FIG. 32, when the user presses the display body 10 along arrow D in a state where the display body 10 is rotated to a position parallel to the display screen turning apparatus 20 (horizontal position), the display body 10 can be rotated to the state where the display body 10 is supported perpendicular to the display screen turning apparatus 20 (at the time of watching and listening) shown in FIG. 30 with the display screen support member 81 through a rotating operation opposite to the above.

Figure 33:
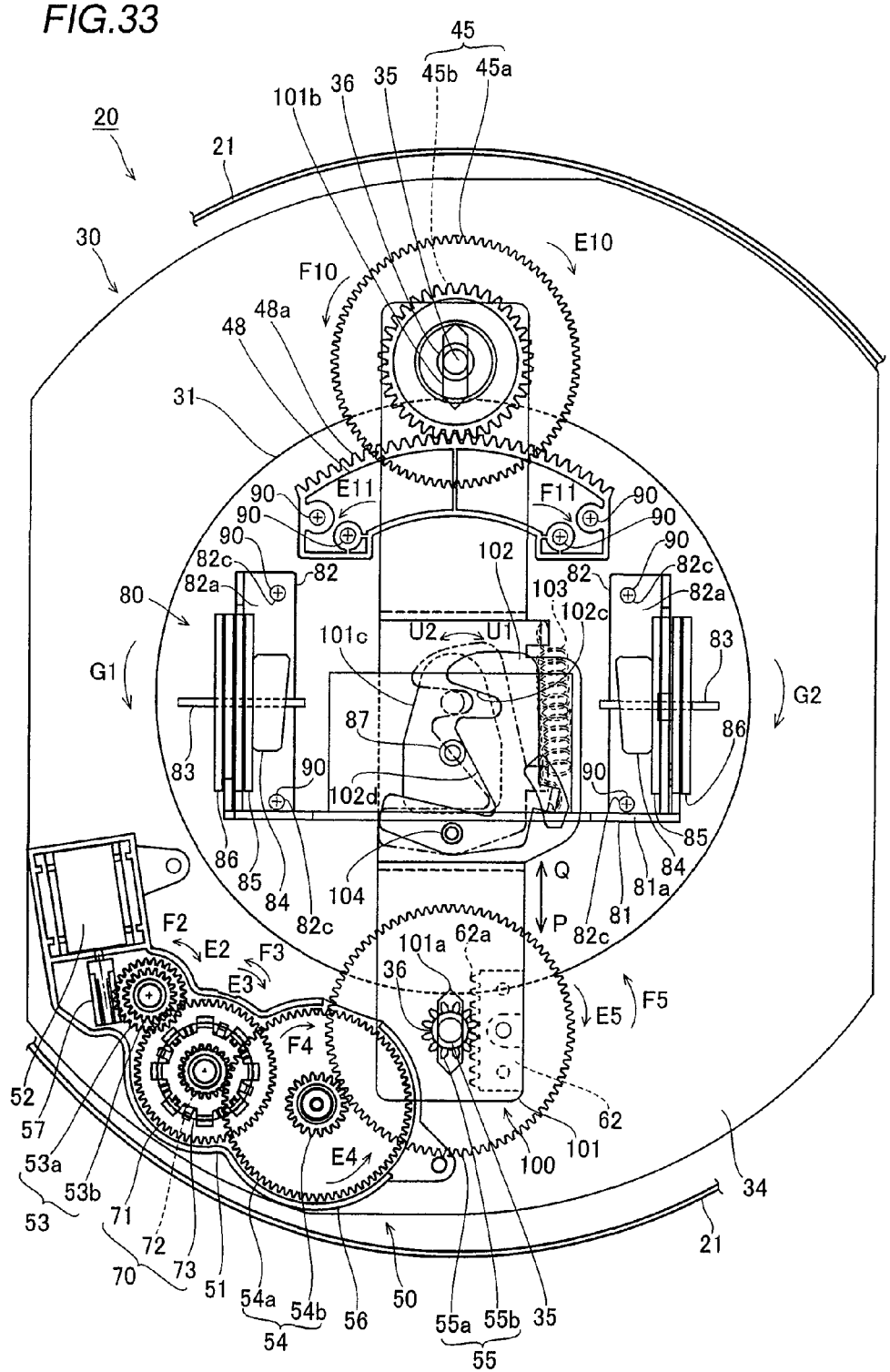
FIG. 33 is a diagram for illustrating an operation of the locking lever of the rack plate according to the second embodiment of the present invention.

According to the second embodiment, when the user rotates the display body 10 from the horizontal position along arrow D by a prescribed angle (about 80° in the second embodiment) as shown in FIG. 31, the side surface portion of the engaging member 87 starts gradually coming into contact with the guide portion 102d of the locking lever 102 following lowering of the engaging member 87 of the display screen support member 81 from obliquely upward to the guide portion 102d of the locking lever 102. At this time, the engaging member 87 is moved (rotated) along the guide portion 102d along arrow Q and the locking lever 102 is rotated from the original position (see FIG. 28) to along arrow U1 by a slight angle, as shown in FIG. 33. In this state, the display body 10 is rotated along allow D by a residual angle of 10° to the state where the display body 10 is supported perpendicular to the display screen turning apparatus 20, as shown in FIG. 30. As shown in FIG. 29, the engaging member 87 passes over the guide portion 102d of the locking lever 102 along arrow Q to reach the engaging portion 102c and the locking lever 102 is rotated along arrow U2 with the pulling force of the spring member 103. In other words, the locking lever 102 returns to the position where the outer shape is shown by a two-dot chain line. Consequently, the engaging state between the engaging member 87 and the engaging portion 102c is recovered as shown in FIG. 29. Therefore, the display body 10 is in the state rotatable in the vertical direction (along arrows D and D in FIG. 30) with respect to the vertical plane following reciprocation (movement along arrows P and Q) of the rack plate 100 in the horizontal plane with the vertical turn driving portion 50 as shown in FIG. 29.

While the aforementioned rotating operation in the vertical direction (along arrows C and D in FIG. 30) is an operation in the state where the display screen support member 81 is perpendicular to the turning plate 31 on the base portion 30 and is directed frontward (state where the center of a turning gear portion 48a of a turning gear member 48 meshes with a minor-diametral gear portion 45b of a gear 45) as shown in FIG. 33, the user can manually turn the display screen support member 81 in the vertical direction (along arrows C and D in FIG. 30) by operating the locking lever 102 similarly to the above also in a state where the turning plate 31 is rotated in the horizontal direction (along arrows G1 and G2) by the prescribed angle as shown in FIGS. 21 and 22.

A vertical turning operation of the display screen support member 81 in a state where the locking lever 102 is engaged with the engaging member 87 is similar to that of the first embodiment mentioned above.

According to the second embodiment, as hereinabove described, the display screen turning apparatus 20 comprises the locking lever 102 rotatably provided on the rack plate 100 and integrally including the engaging portion 102c engaged with the engaging member 87 of the display screen support member 81 and the display screen support member 81 is so formed as to be rotatable to the horizontal position as shown in FIG. 32 when the engagement between the engaging portion 102c and the engaging member 87 of the display screen support member 81 is released, whereby the display body 10 can be easily rotated to the horizontal position also when the liquid crystal television 100 is housed in a prescribed place or moved to other place.

According to the second embodiment, the locking lever 102 includes the guide portion 102d for automatically recovering the engaging state between the engaging member 87 and the engaging portion 102c of the locking lever 102 along with rotation of the engaging member 87 provided in the display screen support member 81 when the display screen support member 81 rotates from the horizontal position in the vertical direction, whereby the engaging member 87 provided in the display screen support member 81 is rotated along the guide portion 102d of the locking lever 102 and guided to the engaging portion 102c when the display body 10 is rotated from the horizontal position (at the time of housing or the like) in the vertical direction (at the time of watching and listening) and hence the engaging state between the engaging member 87 and the engaging portion 102c of the locking lever 102 can be easily recovered. Therefore, the engaging state between the engaging member 87 and the engaging portion 102c of the locking lever 102 can be automatically recovered without any special operation for recovering the engaging state by the user.

According to the second embodiment, the rack plate 100 includes the hole 101c formed in the shape larger than the rotating region of the engaging member 87 at the time of the engaging state between the engaging member 87 of the display screen support member 81 and the engaging portion 102c of the locking lever 102 and at the time of release of the engaging state between the engaging member 87 of the display screen support member 81 and the engaging portion 102c of the locking lever 102, whereby the engaging member 87 moves in a prescribed region inside the hole 110c of the rack plate 100 when the display screen support member 81 rotates, and hence the display screen support member 81 can be rotated without interference between the engaging member 87 and the rack plate 10.

According to the second embodiment, the locking lever 102 is so formed as to transmit reciprocation of the rack plate 100 in the horizontal plane to the display screen support member 81 when the engaging portion 102c and the engaging member 87 of the display screen support member 81 engage with each other, whereby the locking lever 102 not only releases the engagement between the rack plate 100 and the display screen support member 81, but also transmits the reciprocation of the rack plate 100 to the display screen support member 81, whereby the locking lever 102 can be further functionally used.

According to the second embodiment, the locking lever 102 includes the spring member 103 urging in the direction in which the engaging portion 102c of the locking lever 102 is engaged with the engaging member 87 of the display screen support member 81 again when the engagement between the engaging portion 102c of the locking lever 102 and the engaging member 87 of the display screen support member 81 is released, whereby the locking lever 102 is always urged (rotated) with the spring member 103 in the direction where the engaging portion 102c is engaged with the engaging member 87 of the display screen support member 81 and hence the user can easily operate dissimilarly to a case where the user manually recovers the engagement between the locking lever 102 and the display screen support member 81.

The remaining effects of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen turning apparatus is provided in the liquid crystal television employed as an exemplary display in each of the aforementioned embodiments, the present invention is not restricted to this but the display screen turning apparatus may be provided in a display having a display screen portion (display panel) other than the liquid crystal panel such as an organic EL panel.

The engaging member 87 is provided on the arm portion 81e of the display screen support member 81 as a separate member in each of the aforementioned embodiments, the present invention is not restricted to this but the engaging portion may be alternatively provided integrally with the arm portion of the display screen support member.

While the stepping motors 42 and 52 are provided as the driving sources of the horizontal turn driving portion 40 and the vertical turn driving portion 50 in each of the aforementioned embodiments, the present invention is not restricted to this but both the horizontal turn driving portion and the vertical turn driving portion may be alternatively driven with one driving source.

While the rack plate 60 is formed by mounting the rack gear 62 made of resin on the plate member 61 made of sheet metal with the screw 90 in the first embodiment, the present invention is not restricted to this but a rack plate obtained by integrally forming a plate portion and a rack gear portion by sheet metal working or resin molding may be alternatively applied.

What is claimed is:

1. A display screen turning apparatus comprising:
    a base portion for placing a display screen portion thereon;
    a single driving source arranged inside said base portion;
    a transmission gear portion for transmitting driving force of said driving source, arranged inside said base portion;
    a display screen support member provided with an engaging member and supporting said display screen portion rotatably in a horizontal plane and rotatably with respect to a vertical plane;
    a single rack plate arranged on said base portion and including a rack gear linearly extending in a horizontal direction meshed with said transmission gear portion in a horizontal direction; and
    a pair of support shafts provided on said base portion and reciprocably supporting said rack plate in said horizontal plane, wherein
    said display screen support member is rotated in an anteroposterior direction with respect to said vertical plane by moving said engaging member of said display screen support member engaged with said rack plate in accordance with reciprocation movement of said rack plate in said horizontal plane with normal and reverse rotation of said driving source, said display screen support member is rotated around an axis of rotation extending along said horizontal plane, and said rack plate is movably supported with respect to said pair of support shafts so that the rack plate can reciprocate on a line connecting said pair of support shafts.

2. The display screen turning apparatus according to claim 1, wherein said transmission gear portion includes a torque limiter interrupting the driving force of said driving source when the driving force of said driving source exceeds a prescribed value.

3. The display screen turning apparatus according to claim 1, wherein said driving source transmits the driving force of said driving source to said transmission gear portion through a worm gear provided on a driving axis of said driving source.

4. A display screen turning apparatus comprising:
a base portion for placing a display screen portion thereon;
a single driving source arranged inside said base portion;
a transmission gear portion for transmitting driving force of said driving source, arranged inside said base portion;
a display screen support member provided with an engaging member and supporting said display screen portion rotatably in a horizontal plane and rotatably with respect to a vertical plane;
a single rack plate arranged on said base portion and including a rack gear meshed with said transmission gear portion in a horizontal direction; and
a pair of support shafts provided on said base portion and reciprocably supporting said rack plate in said horizontal plane;
wherein said rack plate is movably supported with respect to said pair of support shafts so that the rack plate can reciprocate on a line connecting said pair of support shafts,
said display screen support member is rotated in an anteroposterior direction with respect to said vertical plane by a prescribed angle with rotation of said engaging member of said display screen support member engaged with said rack plate following reciprocation of said rack plate in said horizontal plane with normal and reverse rotation of said driving source,
said display screen support member is rotated around an axis of rotation extending along said horizontal plane,
said rack plate includes a pair of slot-shaped support holes extending substantially parallel to a direction in which said rack plate reciprocates in said horizontal plane, and
said pair of support holes receive said pair of support shafts on said base portion so that said rack plate is movably supported with respect to said pair of support shafts.

5. A display screen turning apparatus comprising:
a base portion for placing a display screen portion thereon;
a single driving source arranged inside said base portion;
a transmission gear portion for transmitting driving force of said driving source, arranged inside said base portion;
a display screen support member provided with an engaging member and supporting said display screen portion rotatably in a horizontal plane and rotatably with respect to a vertical plane; and a single rack plate arranged on said base portion and including a rack gear meshed with said transmission gear portion in a horizontal direction, wherein said display screen support member is rotated in an anteroposterior direction with respect to said vertical plane by a prescribed angle with rotation of said engaging member of said display screen support member engaged with said rack plate following reciprocation of said rack plate in said horizontal plane with normal and reverse rotation of said driving source, said display screen support member is rotated around an axis of rotation extending along said horizontal plane, and said engaging member is provided on a vertical segment passing a rotation center in said horizontal plane of said display screen support member.

6. A display screen turning apparatus comprising:
a base portion for placing a display screen portion thereon;
a single driving source arranged inside said base portion;
a transmission gear portion for transmitting driving force of said driving source, arranged inside said base portion;
a display screen support member provided with an engaging member and supporting said display screen portion rotatably in a horizontal plane and rotatably with respect to a vertical plane; and
a single rack plate arranged on said base portion and including a rack gear linearly extending in a horizontal direction meshed with said transmission gear portion in a horizontal direction, wherein
said display screen support member is rotated in an anteroposterior direction with respect to said vertical plane by a prescribed angle with rotation of said engaging member of said display screen support member engaged with said rack plate following reciprocation of said rack plate in said horizontal plane with normal and reverse rotation of said driving source,
said display screen support member is rotated around an axis of rotation extending along said horizontal plane, and
said rack plate further includes a first engaging portion rotatably engaged with said engaging member of said display screen support member.

7. The display screen turning apparatus according to claim 6, wherein said first engaging portion of said rack plate includes a slot-shaped engaging hole extending in a direction intersecting with a direction in which said rack plate reciprocates in said horizontal plane.

8. A display screen turning apparatus comprising:
a base portion for placing a display screen portion thereon;
a single driving source arranged inside said base portion;
a transmission gear portion for transmitting driving force of said driving source through a worm gear provided on a driving axis of said driving source, arranged inside said base portion, and including a torque limiter interrupting the driving force of said driving source when the driving force of said driving source exceeds a prescribed value;
a display screen support member supporting said display screen portion rotatably in a horizontal plane and rotatably with respect to a vertical plane and provided with an engaging member on a vertical segment passing a rotation center in said horizontal plane; and
a single rack plate arranged on said base portion and including a first engaging portion rotatably engaged with said engaging member of said display screen support member and a rack gear meshed with said transmission gear portion in a horizontal direction, wherein said display screen support member is rotated in an anteroposterior direction with respect to said vertical plane by a prescribed angle with rotation of said engaging member of said display screen support member engaged with said first engaging portion of said rack plate following reciprocation of said rack plate in said horizontal plane with normal and reverse rotation of said driving source, said first engaging portion of said rack plate includes a slot-shaped engaging hole extending in a direction intersecting with a direction in which said rack plate reciprocates in said horizontal plane, and wherein said display screen support member rotates around an axis of rotation extending along said horizontal plane.

9. The display screen turning apparatus according to claim 8, further comprising a pair of support shafts provided on said base portion and reciprocably supporting said rack plate in said horizontal plane, wherein said rack plate is movably supported with respect to said pair of support shafts so that said rack plate can reciprocate on a line connecting said pair of support shafts.

10. The display screen turning apparatus according to claim 9, wherein said rack plate further includes a pair of slot-shaped support holes extending substantially parallel to a direction in which said rack plate reciprocates in said horizontal plane, and said pair of support holes receive said pair of support shafts on said base portion so that said rack plate is movably supported with respect to said pair of support shafts.

* * * * *